United States Patent
Tabata et al.

(10) Patent No.: US 10,596,966 B2
(45) Date of Patent: Mar. 24, 2020

(54) DISPLAY DEVICE FOR VEHICLE AND DISPLAY METHOD FOR VEHICLE

(71) Applicant: JVC KENWOOD CORPORATION, Yokohama-shi, Kanagawa (JP)

(72) Inventors: Kiyofumi Tabata, Yokohama (JP); Shuji Ogawa, Yokohama (JP)

(73) Assignee: JVCKENWOOD CORPORATION, Yokohama-Shi, Kanagawa (JP)

(*) Notice: Subject to any disclaimer, the term of this patent is extended or adjusted under 35 U.S.C. 154(b) by 183 days.

(21) Appl. No.: 15/867,573

(22) Filed: Jan. 10, 2018

(65) Prior Publication Data
US 2018/0126905 A1 May 10, 2018

Related U.S. Application Data

(63) Continuation of application No. PCT/JP2016/002455, filed on May 19, 2016.

(30) Foreign Application Priority Data

Aug. 10, 2015 (JP) ................... 2015-157920
Aug. 10, 2015 (JP) ................... 2015-157921
Mar. 7, 2016 (JP) ................... 2016-043291

(51) Int. Cl.
*B60R 1/00* (2006.01)
*H04N 5/232* (2006.01)
(Continued)

(52) U.S. Cl.
CPC .............. *B60R 1/00* (2013.01); *G06T 3/4038* (2013.01); *G06T 7/70* (2017.01); *H04N 5/23206* (2013.01);
(Continued)

(58) Field of Classification Search
CPC .............. B60R 1/00; B60R 2300/607; B60R 2300/105; B60R 2300/303; B60R 2300/605; H04N 5/247
See application file for complete search history.

(56) References Cited

U.S. PATENT DOCUMENTS 7,161,616 B1 1/2007 Okamoto et al.
2010/0019934 A1 1/2010 Takano
(Continued)

FOREIGN PATENT DOCUMENTS

CN 104385987 A 3/2015
JP 3300334 B 4/2002
(Continued)

OTHER PUBLICATIONS

International Search Report for related International Application No. PCT/JP2016/002455 dated Aug. 9, 2016, 4 pages. English translation provided.

*Primary Examiner* — Obafemi O Sosanya
(74) *Attorney, Agent, or Firm* — Procopio, Cory, Hargreaves & Savitch LLP

(57) ABSTRACT

A display device for a vehicle includes an imaging unit configured to capture a video around a vehicle, a generation unit configured to generate a bird's eye view video obtained by converting a viewpoint of the captured video so it seems as if the vehicle is seen from above, a horizontally long display unit disposed in front of a driver's seat in the vehicle, an information acquisition unit configured to acquire information on a steering angle of the vehicle, an orientation determination unit configured to determine as to whether a steering orientation of the vehicle is left or right based on the information on the steering angle of the vehicle, and a display control unit configured to perform control in such a way that a display mode of the bird's eye view video (Continued)

displayed on the display unit is changed according to the steering orientation of the vehicle.

7 Claims, 19 Drawing Sheets

(51) Int. Cl.
    *H04N 5/247*           (2006.01)
    *G06T 7/70*            (2017.01)
    *H04N 7/18*            (2006.01)
    *G06T 3/40*            (2006.01)

(52) U.S. Cl.
    CPC ..... *H04N 5/23241* (2013.01); *H04N 5/23245* (2013.01); *H04N 5/23293* (2013.01); *H04N 5/232939* (2018.08); *H04N 5/247* (2013.01); *H04N 7/18* (2013.01); *H04N 7/181* (2013.01); *B60R 2300/105* (2013.01); *B60R 2300/303* (2013.01); *B60R 2300/605* (2013.01); *B60R 2300/607* (2013.01); *B60R 2300/806* (2013.01)

(56) References Cited

U.S. PATENT DOCUMENTS

| 2010/0214412 | A1* | 8/2010 | Ehlgen | G06K 9/00791 |
| | | | | 348/148 |
| 2014/0354452 | A1 | 12/2014 | Okuyama | |
| 2018/0009378 | A1* | 1/2018 | Myers | B60Q 9/008 |

FOREIGN PATENT DOCUMENTS

| JP | 2007-223338 A | 9/2007 |
| JP | 2011-002884 A | 1/2011 |
| JP | 2010-034645 A | 2/2012 |
| JP | 2012-066700 A | 4/2012 |
| JP | 2013-006548 A | 1/2013 |
| KR | 2010-0021046 A | 2/2010 |

* cited by examiner

DISPLAY DEVICE FOR VEHICLE AND DISPLAY METHOD FOR VEHICLE

CROSS REFERENCE TO RELATED APPLICATION

This application is a continuation of International Application No. PCT/JP2016/002455, filed May 19, 2016, and based upon and claims the benefit of priority from Japanese Patent Application No. 2015-157920, filed on Aug. 10, 2015, Japanese Patent Application No. 2015-157921, filed on Aug. 10, 2015, and Japanese Patent Application No. 2016-043291, filed on Mar. 7, 2016, the disclosure of which is incorporated herein in its entirety by reference.

BACKGROUND

The present disclosure relates to a display device for a vehicle and a display method for a vehicle. In particular, the present disclosure relates to a display device for a vehicle and a display method for a vehicle for displaying a bird's view eye video.

There is a technique of capturing a video around a vehicle and generating a bird's eye view video by converting a viewpoint of the captured video so it seems as if the vehicle is seen from above (e.g., Japanese Unexamined Patent Application Publication No. 2012-066700). Recently, there are an increasing number of vehicles equipped with a display device for a vehicle implementing this technique. In such vehicles, a bird's eye view video is displayed during a parking operation or the like.

SUMMARY

Incidentally, in a vehicle, a bird's eye view video is often displayed on a display unit disposed on a center console. However, in many cases, the display unit disposed on the center console is in the form of a horizontally long rectangle. On the other hand, the bird's eye view video is commonly a portrait video displaying the front of the vehicle facing upward.

Therefore, when the bird's eye view video is displayed on the display unit, the bird's eye view video is displayed so that a vertical width of the portrait bird's eye view video fits in a vertical width of the horizontally long display unit. Such a display reduces a display area of the bird's eye view video. This could cause a problem such as letting a user overlook an obstacle displayed in the bird's eye view video. Moreover, in such a display, a traveling direction of the vehicle is not consistent with that of the vehicle in the bird's eye view video. This could cause a problem such as making it difficult to understand a positional relationship of an obstacle displayed in the bird's eye view video.

Further, when the bird's eye view video is displayed laterally, a user (who is often a driver) must select a display pattern of the bird's eye view video. Having the user select the display pattern of the bird's eye view video during a parking operation requires the user's time and effort, which is inappropriate.

Moreover, a display position of the bird's eye view video on the display unit disposed on the center console is commonly fixed and is often at a position where it is difficult to visually observe the bird's eye view video together with visual observation outside the vehicle.

Therefore, some drivers perform the parking operation while gazing at the bird's eye view video displayed on the display unit with almost no visual observation outside the vehicle.

However, in the bird's eye view video, an obstacle and the like located above a position of an imaging unit are not displayed, or the sense of distance may be impaired due to combining processing or the like. Thus, in addition to the visual observation of the bird's eye view video, the driver preferably visually observes outside the vehicle.

An example aspect is a display device for a vehicle including:
an imaging unit configured to capture a video around a vehicle;
a bird's eye view video generation unit configured to generate a bird's eye view video obtained by converting a viewpoint of the video captured by the imaging unit so it seems as if the vehicle is seen from above;
a horizontally long display unit disposed in front of a driver's seat in the vehicle;
an information acquisition unit configured to acquire information on a steering angle of the vehicle;
an orientation determination unit configured to determine as to whether a steering orientation of the vehicle is left or right based on the information on the steering angle of the vehicle acquired by the information acquisition unit; and
a display control unit configured to perform control in such a way that a display mode of the bird's eye view video on the display unit is changed according to the steering orientation of the vehicle determined by the orientation determination unit and the bird's eye view video is displayed.

A display method for a vehicle performed by a display device for a vehicle including a horizontally long display unit disposed in front of a driver's seat in a vehicle. The display method includes:
capturing a video around the vehicle;
generating a bird's eye view video obtained by converting a viewpoint of the video captured so it seems as if the vehicle is seen from above;
acquiring information on a steering angle of the vehicle;
determining as to whether a steering orientation of the vehicle is left or right based on the information on the steering angle of the vehicle; and
changing a display mode of the bird's eye view video on the display unit according to the steering orientation of the vehicle.

DETAILED DESCRIPTION

Hereinafter, embodiments of the present disclosure will be described with reference to the drawings.

(1) First Embodiment

Figure 1:
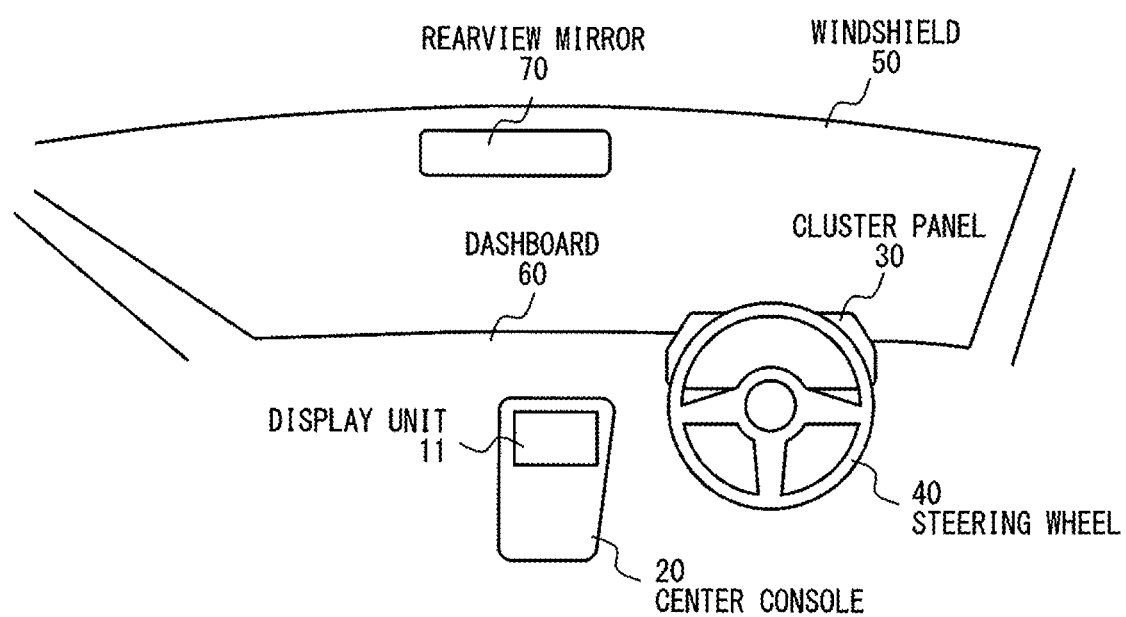
FIG. 1 is a schematic diagram showing an example of a front side of a driver's seat in a vehicle on which a display device for a vehicle according to first, second, third, and sixth embodiments is mounted.

FIG. 1 is a diagram schematically showing an example of a front side of a driver's seat in a vehicle on which a display device for a vehicle 10 according to a first embodiment is mounted. In the vehicle shown in FIG. 1, a bird's eye view video is displayed on a horizontally long display unit 11 disposed on a center console 20. In front of the driver's seat in the vehicle shown in FIG. 1, in addition to the display unit 11 and the center console 20, a cluster panel 30, a steering wheel 40, a windshield 50, a dashboard 60, and a rearview mirror 70, etc. are arranged.

The display unit 11 displays the above-mentioned bird's eye view video and displays a navigation screen or the like before switching to the bird's eye view video. The steering wheel 40 is for a driver to carry out a steering operation. A steering orientation of the vehicle is changed according to the steering operation of the steering wheel 40. The cluster panel 30 is disposed on the dashboard 60 below the windshield 50. A speedometer, an engine tachometer, and the like are displayed on the cluster panel 30. The rearview mirror 70 is a mirror for the driver to check behind the vehicle.

Figure 2:
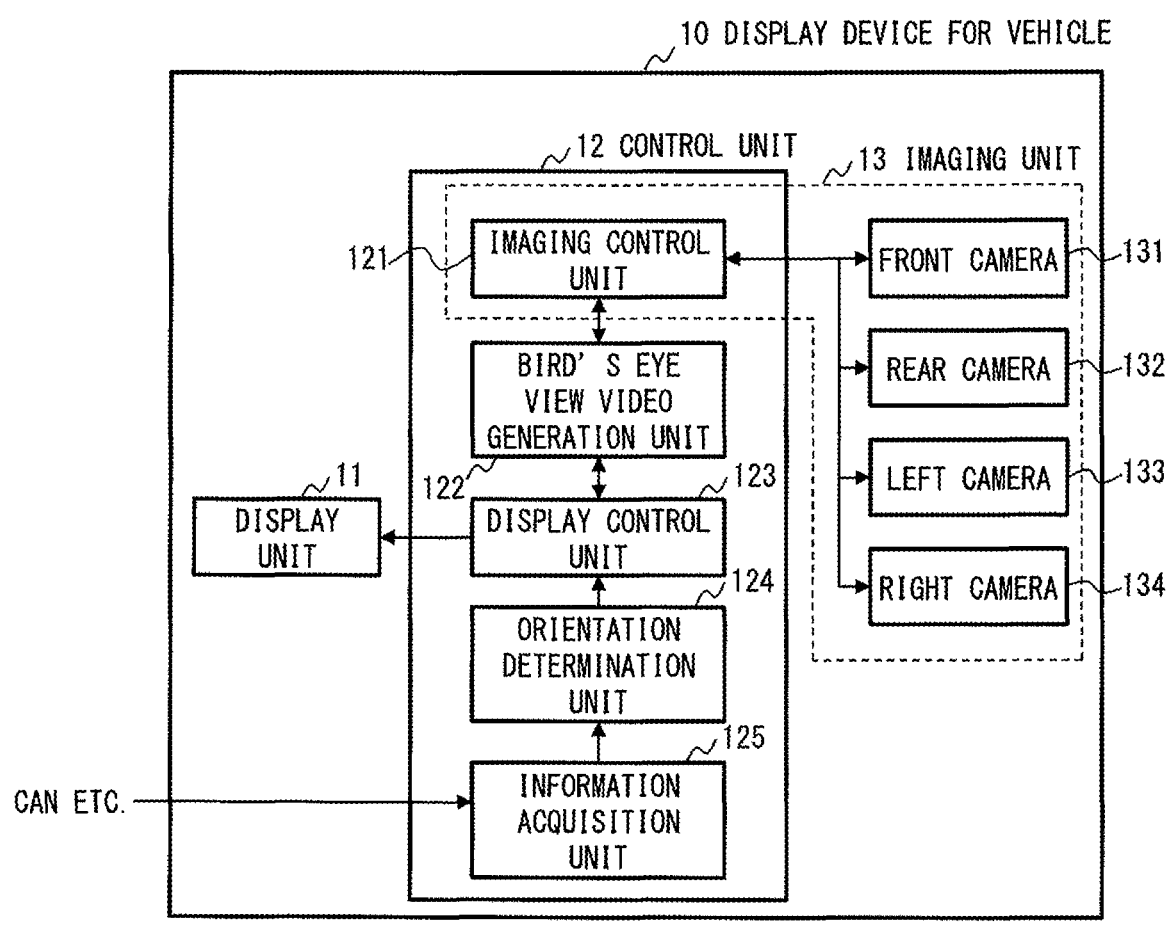
FIG. 2 is a block diagram showing a configuration example of a display device for a vehicle according to first, second, third, fourth, and fifth embodiments.

FIG. 2 is a block diagram showing a configuration example of the display device for the vehicle 10 according to the first embodiment. The display device for the vehicle 10 shown in FIG. 2 includes the display unit 11, a control unit 12, a front camera 131, a rear camera 132, a left camera 133, and a right camera 134. The control unit 12 includes an imaging control unit 121, a bird's eye view video generation unit 122, a display control unit 123, an orientation determination unit 124, and an information acquisition unit 125. The imaging unit 13 for capturing videos around the vehicle is composed of the imaging control unit 121, the front camera 131, the rear camera 132, the left camera 133, and the right camera 134. Further, each of the respective components constituting the control unit 12 may be composed of a processor, or it may be software or a module in which processing is executed by a processor executing a program stored in a memory.

The front camera 131 is a camera that captures a front side video in front of the vehicle. The rear camera 132 is a camera that captures a rear side video behind the vehicle. The left camera 133 is a camera that captures a left side video on the left side of the vehicle.

The right camera 134 is a camera that captures a right side video on the right side of the vehicle. The imaging control unit 121 controls each of the front camera 131, the rear camera 132, the left camera 133, and the right camera 134 to capture the above-mentioned videos.

Figure 3:
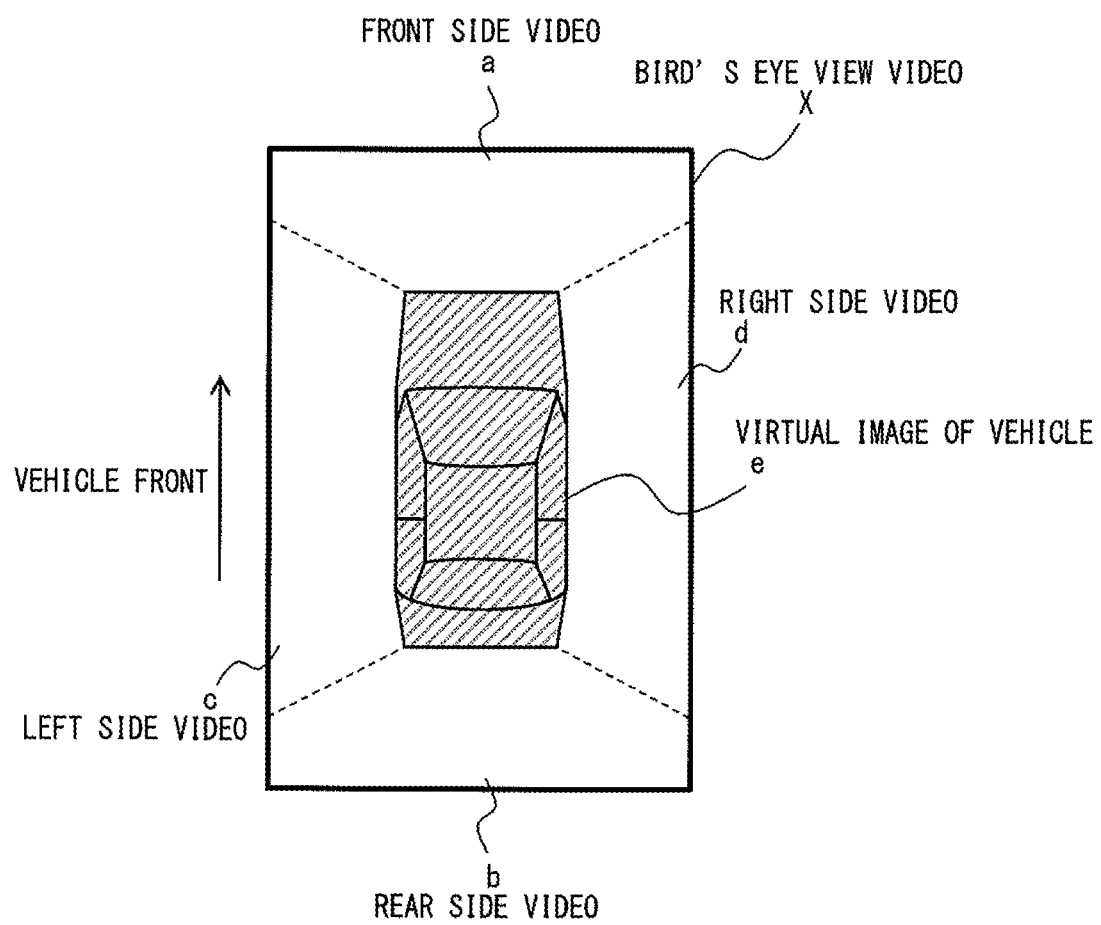
FIG. 3 is a diagram showing an example of a bird's eye view video generated by the display device for the vehicle according to the first to seventh embodiments.

The bird's eye view video generation unit 122 generates a bird's eye view video X obtained by converting a viewpoint of a video around the vehicle so it seems as if the vehicle is seen from above. FIG. 3 is a diagram showing an example of the bird's eye view video X generated by the bird's eye view video generation unit 122. The bird's eye view video generation unit 122 converts viewpoints of the respective videos, i.e., a front side video a, a rear side video b, a left side video c, and a right side video d that are captured by the front camera 131, the rear camera 132, the left camera 133, and the right camera 134, respectively, so it seems as if the vehicle is seen from above. Then, the bird's eye view video generation unit 122 combines the respective videos having the converted viewpoints with a virtual image of the vehicle e to generate the bird's eye view video X. Here, it is assumed that the bird's eye view video generation unit 122 generates the portrait bird's eye view video X in which the vehicle length direction of the vehicle in the bird's eye view video X is vertically disposed. In FIG. 3, the bird's eye view video generation unit 122 generates the portrait bird's eye view video X with the front of the vehicle facing upward.

The display unit 11 is disposed in front of the driver's seat in the vehicle and is a horizontally long display unit for displaying the bird's eye view video X and the like generated by the bird's eye view video generation unit 122. In the example of FIG. 1, the display unit 11 is disposed on the center console 20.

The information acquisition unit 125 acquires various pieces of information from a CAN (Controller Area Network), a sensor, and the like. In the first embodiment, the information acquisition unit 125 acquires information on a steering angle of the vehicle from the CAN or a steering angle sensor. Here, the information on the steering angle of the vehicle acquired by the information acquisition unit 125 is information indicating a ±angle with reference to a 0 steering angle degree of the vehicle, a voltage value corresponding to the ±angle, and the like.

The orientation determination unit 124 determines as to whether the steering orientation of the vehicle is left or right based on the information on the steering angle of the vehicle acquired by the information acquisition unit 125. For example, the orientation determination unit 124 determines the steering orientation of the vehicle based on which of left and right sides the steering orientation of the vehicle is oriented with reference to the 0 steering angle of the vehicle. Alternatively, the orientation determination unit 124 determines the steering orientation of the vehicle based on which of left and right sides the steering orientation of the vehicle is oriented with reference to the steering orientation of the vehicle when the display of the bird's eye view video is started (the display of the bird's eye view video is started when, for example, a reverse gear is selected).

The display control unit 123 controls the display unit 11 to display the bird's eye view video X and the like generated by the bird's eye view video generation unit 122 on the display unit 11. When the display control unit 123 performs control to display the bird's eye view video X generated by the bird's eye view video generation unit 122 on the display unit 11, it performs control in such a way that a display mode of the bird's eye view video X is changed according to the steering orientation of the vehicle determined by the orientation determination unit 124, and the bird's eye view video is displayed on the display unit 11. Changing the display mode of the bird's eye view video X according to the steering orientation of the vehicle is to change a display orientation of the bird's eye view video X or to display the bird's eye view video X in the left or right direction on the display unit 11 according to the steering orientation of the vehicle. In the first embodiment, the display control unit 123 changes the display orientation of the bird's eye view video X according to the steering orientation of the vehicle. Specifically, the display control unit 123 performs control in such a way that the bird's eye view video X is arranged laterally and displayed on the display unit 11 so that the front of the vehicle in the bird's eye view video X is oriented to the steering orientation of the vehicle.

Figure 4:
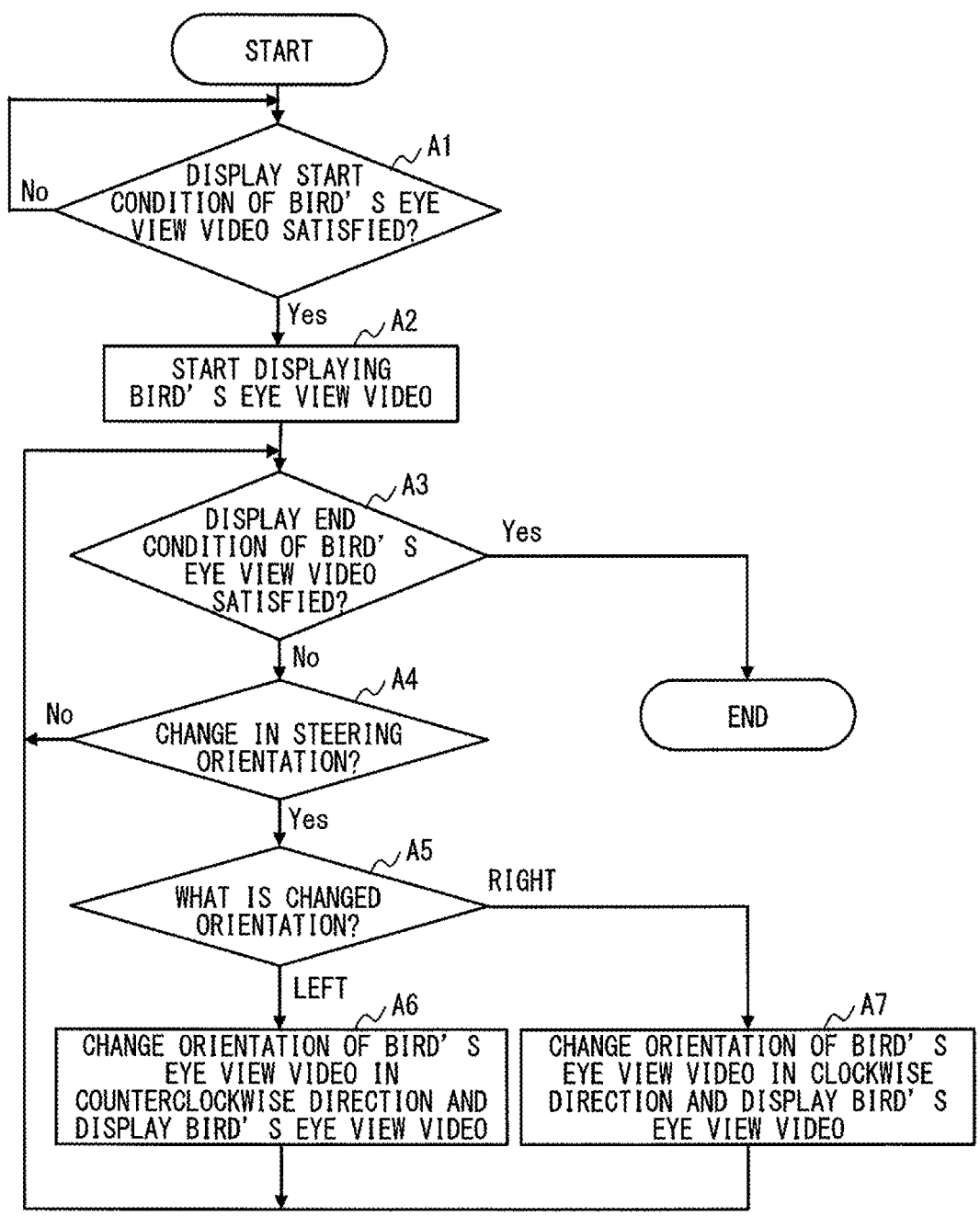
FIG. 4 is a flowchart showing an operation example of displaying the bird's eye view video on the display device for the vehicle according to the first embodiment.

Hereinafter, an operation of the display device for the vehicle 10 according to the first embodiment will be described. FIG. 4 is a flowchart showing an operation example of displaying the bird's eye view video X on the display device for the vehicle 10 according to the first embodiment.

First, the display control unit 123 determines as to whether or not a display start condition of the bird's eye view video X generated by the bird's eye view video generation unit 122 is satisfied (Step A1). There may be various conditions for the display start condition for the bird's eye view video X. The various conditions are, for example, the reverse gear has been selected, a garage parking display mode has been selected, a current position is at a pre-registered garage or parking lot, or the like.

In Step A1, if the display start condition of the bird's eye view video X is not satisfied (No in Step A1), the process returns to Step A1. On the other hand, in Step A1, when the display start condition of the bird's eye view video X is satisfied (Yes in Step A1), the display control unit 123 performs control in such a way that the display of the bird's eye view video X generated by the bird's eye view video generation unit 122 on the display unit 11 is started (Step A2). At this point, the display control unit 123 performs control so that the bird's eye view video X is arranged vertically to be displayed on the display unit 11.

Next, the display control unit 123 determines as to whether or not a display end condition of the bird's eye view video X is satisfied (Step A3). The display end condition of the bird's eye view video X is, for example, the above-described display start conditions are no longer satisfied. Specifically, a gear other than the reverse gear has been selected, a display mode other than the garage parking display mode has been selected, the current position is outside of the pre-registered garage or parking lot, or the like.

In Step A3, if the display end condition of the bird's eye view video X is satisfied (Yes in Step A3), the process is ended. On the other hand, in Step A3, if the display end condition of the bird's eye view video X is not satisfied in (No in Step A3), the orientation determination unit 124 determines as to whether or not the steering orientation of the vehicle has been changed (Step A4). Note that when the orientation determination unit 124 makes a determination of Step A4 for the first time after the process has proceeded from Step A2, it determines that the steering orientation of the vehicle has been changed.

If the steering orientation of the vehicle has not been changed in Step A4 (No in Step A4), the process returns to Step A3.

On the other hand, in Step A4, if the steering orientation of the vehicle has been changed (Yes in Step A4), the orientation determination unit 124 changes a result of the determination on the steering orientation of the vehicle, and the display control unit 123 determines the changed steering orientation (Step A5).

Figure 5:
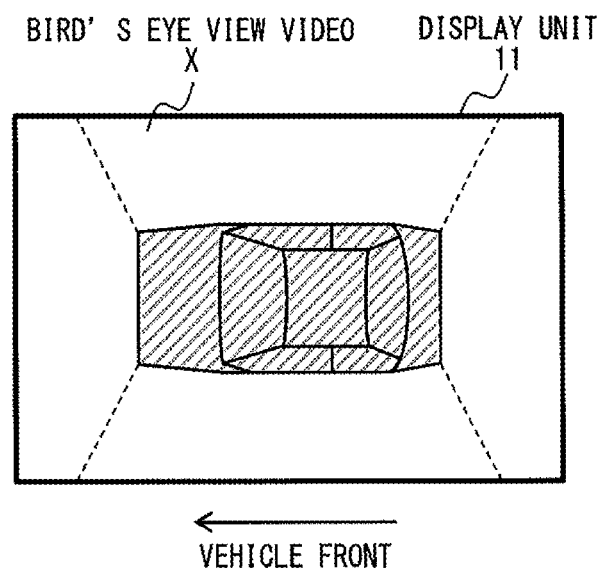
FIG. 5 is a diagram showing a display example of the bird's eye view video displayed on the display device for the vehicle according to the first, third, and sixth embodiments.

In Step A5, if the changed steering orientation of the vehicle is left, the display control unit 123 performs control in such a way that the orientation of the bird's eye view video X generated by the bird's eye view video generation unit 122 is changed in the counterclockwise direction and the bird's eye view video X is displayed on the display unit 11 (Step A6). Then, the front of the vehicle in the bird's eye view video X displayed on the display unit 11 is oriented to the left, which is the steering orientation of the vehicle. FIG. 5 shows a display example of the bird's eye view video X displayed on the display unit 11 at this time. When the process of Step A6 is ended, the process returns to Step A3.

Figure 6:
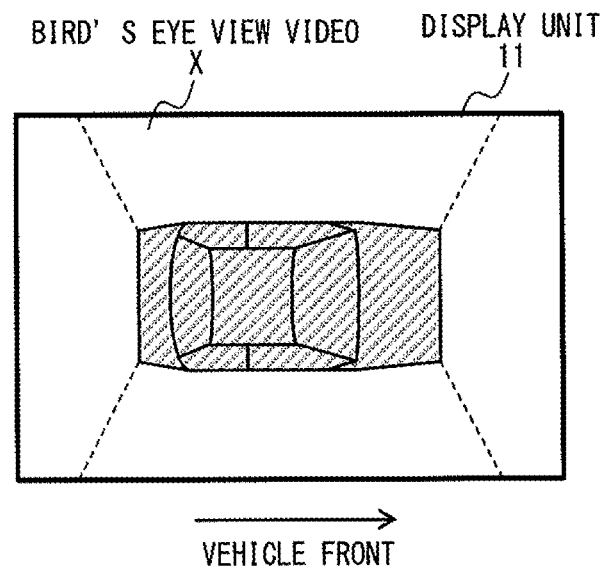
FIG. 6 is a diagram showing a display example of the bird's eye view video displayed on the display device for the vehicle according to the first, third, and sixth embodiments.

On the other hand, in Step A5, when the changed steering orientation of the vehicle is right, the display control unit 123 performs control in such a way that the orientation of the bird's eye view video X generated by the bird's eye view video generation unit 122 is changed in the clockwise direction and the bird's eye view video X is displayed on the display unit 11 (Step A7). Then, the front of the vehicle in the bird's eye view video X displayed on the display unit 11 is oriented to the right, which is the steering orientation of the vehicle. FIG. 6 shows a display example of the bird's eye view video X displayed on the display unit 11 at this time. When the process of Step A7 is ended, the process returns to Step A3.

As described above, according to the first embodiment, the display device for the vehicle 10 determines the steering orientation of the vehicle based on the information on the steering angle of the vehicle, changes the display orientation of the bird's view video X according to the steering orientation of the vehicle, and displays the bird's eye view video X on the display unit 11.

Therefore, even when the horizontally long display unit 11 is used, it is possible to display the bird's eye view video X in such a manner that a display area thereof is increased. Thus, the area of the display screen of the display unit 11 can be effectively utilized. Moreover, since the display orientation of the bird's eye view video X is changed and the bird's eye view video X is displayed according to the steering orientation of the vehicle, the display orientation of the bird's eye view video X can be changed without requiring the user's time and effort. Furthermore, it is possible to display the bird's eye view video X with the traveling direction of the vehicle corresponding to the display orientation of the bird's eye view video X, and the display orientation of the bird's eye view video X being consistent with the traveling direction of the vehicle and with no unnatural impression.

As described above, the orientation determination unit 124 determines the steering orientation of the vehicle based on which of left and right sides the steering orientation of the vehicle is oriented with reference to the 0 steering angle degree or the like of the vehicle. Therefore, the steering orientation of the vehicle may be switched by a slight steering operation in the vicinity of the reference. If each time the steering orientation of the vehicle is frequently switched in the vicinity of the reference, the orientation determination unit 124 determines that the steering orientation of the vehicle has been changed in Step A4 of FIG. 4, the left and right orientations of the vehicle in the bird's eye view video X displayed on the display unit 11 is frequently switched.

Thus, it is appropriate that the orientation determination unit 124 determines that the steering orientation of the vehicle has been changed in the direction of rotation when the steering angle of the vehicle has been rotated by a predetermined angle or greater. In other words, even when the steering orientation of the vehicle is switched to the left or the right in the vicinity of the reference, if the steering angle of the vehicle is not rotated by the predetermined angle or greater, the orientation determination unit 124 determines that the steering orientation of the vehicle has not been changed. Although the predetermined angle varies depending on the type of the vehicle, for example, if three turns are needed for lock-to-lock, the predetermined angle can be about 90 degrees or greater or 120 degrees or greater. By the operation of the orientation determination unit 124 described above, it is possible to prevent the left and right orientations of the vehicle in the bird's eye view video X displayed on the display unit 11 from being frequently switched by a slight steering operation in the vicinity of the reference.

(2) Second Embodiment

A vehicle on which a display device for a vehicle 10 according to a second embodiment is mounted is the same as that of the first embodiment. The display device for the vehicle 10 according to the second embodiment is similar to the display device for the vehicle 10 of the first embodiment in configuration, but operates differently. In the second embodiment, the display control unit 123 performs control in such a way that the bird's eye view video X is displayed in a tilted manner on the display unit 11 so that the front of the vehicle in the bird's eye view video X is oriented to the steering orientation of the vehicle.

Figure 7:
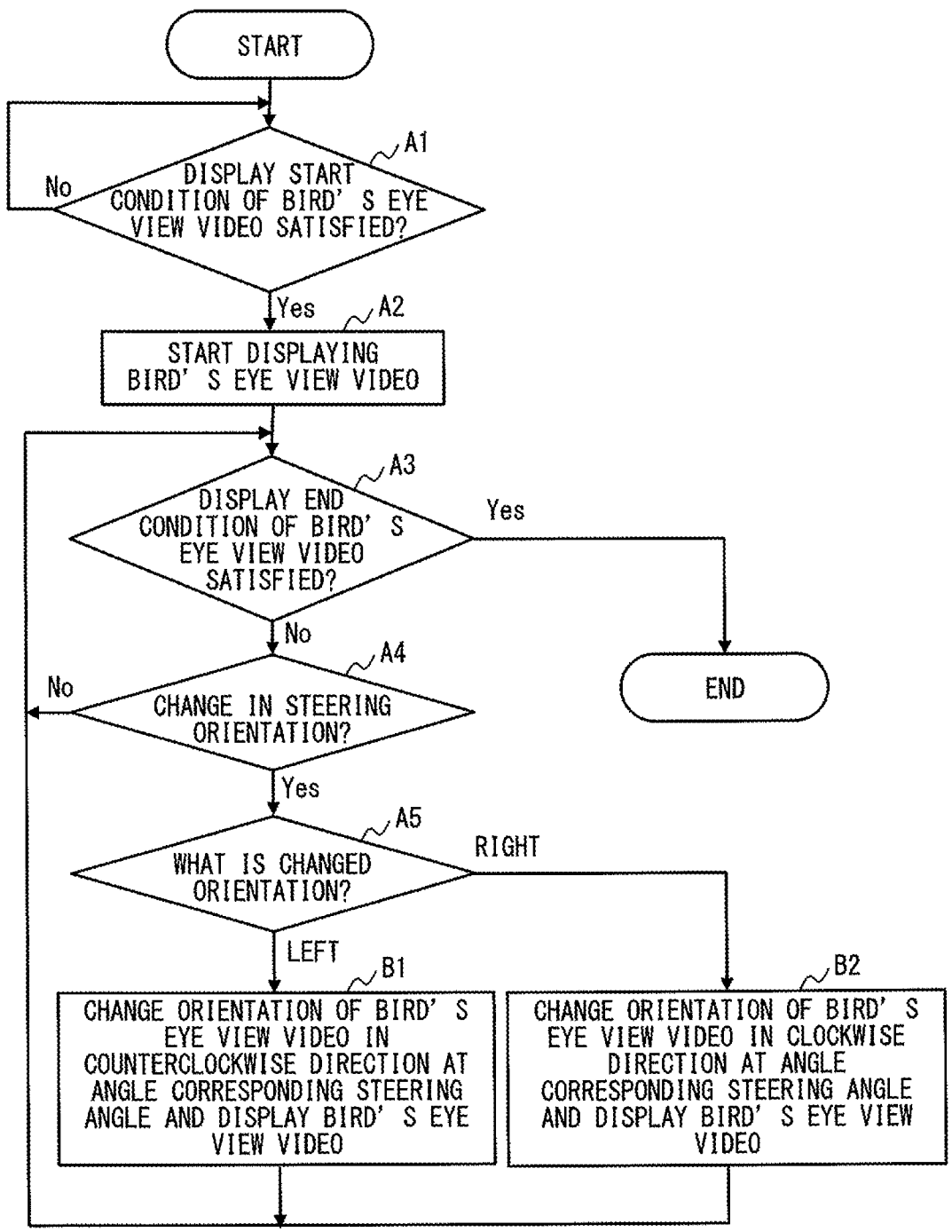
FIG. 7 is a flowchart showing an operation example of displaying the bird's eye view video on the display device for the vehicle according to the second embodiment.

Therefore, the description of the configuration of the display device for the vehicle 10 according to the second embodiment will be omitted, and only an operation of the display device for the vehicle 10 according to the second embodiment will be described. FIG. 7 is a flowchart showing an operation example of displaying the bird's eye view video X on the display device for the vehicle 10 according to the second embodiment. The flowchart shown in FIG. 7 differs from the flowchart of the first embodiment shown in FIG. 4 in that Steps A6 and A7 are replaced with Steps B1 and B2, respectively.

First, like in the first embodiment, the processes of Steps A1 to A5 are performed.

Figure 8:
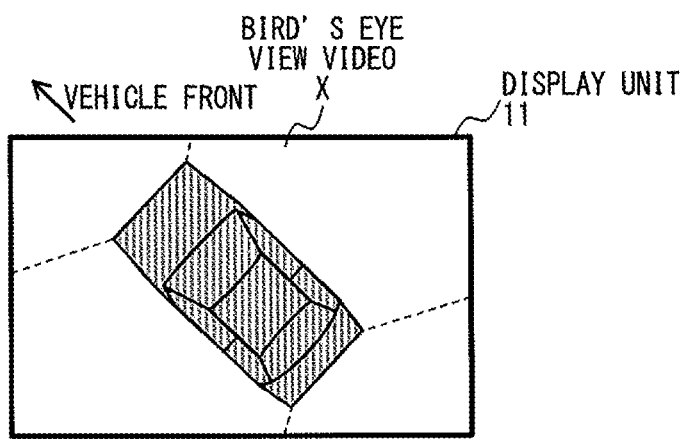
FIG. 8 is a diagram showing a display example of the bird's eye view video displayed on the display device for the vehicle according to the second embodiment.

In Step A5, if the changed steering orientation of the vehicle is left, the orientation determination unit 124 determines the steering angle of the vehicle based on the information on the steering angle of the vehicle acquired by the information acquisition unit 125. The display control unit 123 performs control in such a way that the bird's eye view video X is tilted to the left and displayed on the display unit 11 so that the front of the vehicle in the bird's eye view X generated by the bird's eye view video generation unit 122 is oriented to the left. Specifically, the display control unit 123 performs control in such a way that the orientation of the bird's eye view video X generated by the bird's eye view video generation unit 122 is changed in the counterclockwise direction at an angle corresponding to a steering angle, and the bird's eye view video X is displayed on the display unit 11 (Step B1). Then, the front of the vehicle in the bird's eye view video X displayed on the display unit 11 is oriented to the left, which is the steering orientation of the vehicle, and is tilted to the left at the angle corresponding to the steering angle. FIG. 8 shows a display example of the bird's eye view video X displayed on the display unit 11 at this time. When the process of Step B1 is ended, the process returns to Step A3.

Figure 9:
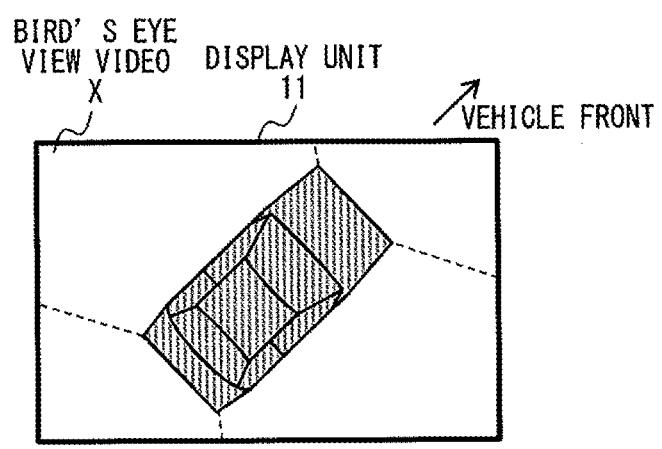
FIG. 9 is a diagram showing a display example of the bird's eye view video displayed on the display device for the vehicle according to the second embodiment.

In Step A5, if the changed steering orientation of the vehicle is right, the orientation determination unit 124 determines the steering angle of the vehicle based on the information on the steering angle of the vehicle acquired by the information acquisition unit 125. The display control unit 123 performs control in such a way that the bird's eye view video X is tilted to the right and displayed on the display unit 11 so that the front of the vehicle in the bird's eye view X generated by the bird's eye view video generation unit 122 is oriented to the right. Specifically, the display control unit 123 performs control in such a way that the orientation of the bird's eye view video X generated by the bird's eye view video generation unit 122 is changed in the clockwise direction at an angle corresponding to the steering angle, and the bird's eye view video X is displayed on the display unit 11 (Step B2). Then, the front of the vehicle in the bird's eye view video X displayed on the display unit 11 is oriented to the right, which is the steering orientation of the vehicle, and is tilted to the right at the angle corresponding to the steering angle. FIG. 9 shows a display example of the bird's eye view video X displayed on the display unit 11 at this time. When the process of Step B2 is ended, the process returns to Step A3.

As described above, according to the second embodiment, the display device for the vehicle 10 determines the steering orientation of the vehicle and the steering angle of the vehicle based on the information on the steering angle of the vehicle, and displays the bird's eye view video X tilted at the angle corresponding to the steering angle of the vehicle on the display unit 11 so that the front of the vehicle in the bird's eye view video X is oriented to the steering orientation of the vehicle.

Thus, the second embodiment is the same as the first embodiment in that the display orientation of the bird's eye view video X is changed according to the steering orientation of the vehicle and the bird's eye view video X is displayed. Therefore, like the first embodiment, in the second embodiment, even when the horizontally long display unit 11 is used, it is possible to effectively utilize the area of the display screen and to change the display orientation of the bird's eye view video X without requiring the user's time and effort. Furthermore, an effect can be achieved that it is possible to display the bird's eye view video X with the traveling direction of the vehicle corresponding to the display orientation of the bird's eye view video X, with the display orientation of the bird's eye view video X being consistent with the traveling direction of the vehicle, and with no unnatural impression.

(3) Third Embodiment

A vehicle on which a display device for a vehicle 10 according to a third embodiment is mounted is the same as that of the first embodiment. The display device for the vehicle 10 according to the third embodiment is similar to the display device for the vehicle 10 of the first embodiment in configuration, but operates differently. In the third embodiment, when the steering orientation of the vehicle is maintained for a predetermined time or longer, the display control unit 123 performs control in such a way that the bird's eye view video X is arranged laterally on the display unit 11 so that the front of the vehicle in the bird's eye view video X is oriented to the steering orientation of the vehicle.

Figure 10:
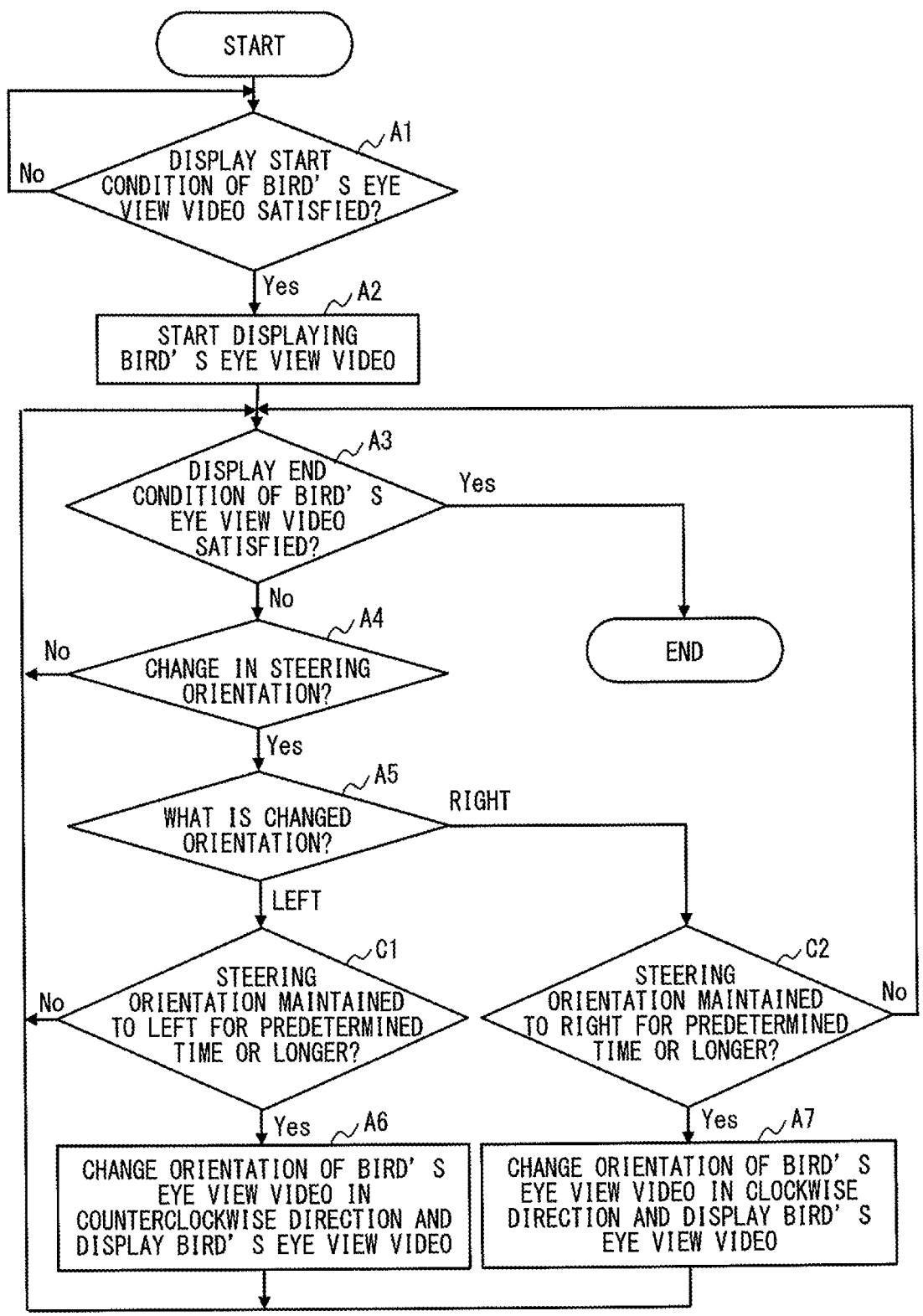
FIG. 10 is a flowchart showing an operation example of displaying the bird's eye view video on the display device for the vehicle according to the third embodiment.

Therefore, the description of the configuration of the display device for the vehicle 10 according to the third embodiment will be omitted, and only an operation of the display device for the vehicle 10 according to the third embodiment will be described. FIG. 10 is a flowchart showing an operation example of displaying the bird's eye view video X on the display device for the vehicle 10 according to the third embodiment. The flowchart shown in FIG. 10 differs from the flowchart of the first embodiment shown in FIG. 4 in that Steps C1 and C2 are added to the flowchart shown in FIG. 4.

First, like in the first embodiment, the processes of Steps A1 to A5 are performed.

In Step A5, if the changed steering orientation of the vehicle is left, the orientation determination unit 124 measures a time during which the steering orientation of the vehicle is maintained to the left, and the display control unit 123 determines as to whether or not the steering orientation of the vehicle is maintained to the left for the predetermined time or longer (Step C1). At this time, when the steering orientation of the vehicle is left, regardless of changes in the steering angle of the vehicle, the orientation determination unit 124 determines that the steering angle of the vehicle is maintained to the left. The predetermined time may be, for example, about five seconds.

In Step C1, when the steering orientation of the vehicle is maintained to the left for the predetermined time or longer (Yes in Step C1), the display control unit 123 performs control in such a way that the bird's eye view video X generated by the bird's eye view video generation unit 122 is rotated to the left and displayed it laterally on the display unit 11 (Step A6). On the other hand, in Step C1, when the steering orientation of the vehicle is not maintained to the left for the predetermined time or longer (No in Step C1), the process returns to Step A3. As an example of a case where Step C1 is No, there may be a case where the steering orientation of the vehicle has been changed from left to right before the predetermined time elapses.

In Step A5, if the changed steering orientation of the vehicle is right, the orientation determination unit 124 measures a time during which the steering orientation of the vehicle is maintained to the right, and the display control unit 123 determines as to whether or not the steering orientation of the vehicle is maintained to the right for the predetermined time or longer (Step C2). At this time, when the steering orientation of the vehicle is right, regardless of changes in the steering angle of the vehicle, the orientation determination unit 124 determines that the steering angle of the vehicle is maintained to the right. As in the Step C1, the predetermined time may be, for example, about five seconds.

In Step C2, when the steering orientation of the vehicle is maintained to the right for the predetermined time or longer (Yes in Step C2), the display control unit 123 performs control in such a way that the bird's eye view video X generated by the bird's eye view video generation unit 122 is rotated to the right and displayed it laterally on the display unit 11 (Step A7). On the other hand, in Step C2, when the steering orientation of the vehicle is not maintained to the right for the predetermined time or longer (No in Step C2), the process returns to Step A3. As an example of a case where Step C2 is No, there may be a case where the steering orientation of the vehicle has been changed from right to left before the predetermined time elapses.

As described above, according to the third embodiment, in the display device for the vehicle 10, when the steering orientation of the vehicle is changed and the changed orientation is maintained for the predetermined time or longer, the bird's eye view video X is arranged laterally to be displayed on the display unit 11 so that the front of the vehicle in the bird's eye view video X is oriented to the changed steering orientation of the vehicle.

Therefore, even when the steering orientation of the vehicle is changed, if the steering orientation of the vehicle returns to its original state before the predetermined time elapses, the front of the vehicle in the bird's eye view video X displayed on the display unit 11 remains to be oriented to the original steering orientation of the vehicle. In this way, it is possible to prevent the left and right orientations of the vehicle in the bird's eye view video X displayed on the display unit 11 from being frequently switched.

The third embodiment is the same as the first embodiment in that it is configured to change the display orientation of the bird's eye view video X according to the steering orientation of the vehicle and to display the bird's eye view video X. Therefore, like the first embodiment, in the third embodiment, even when the horizontally long display unit 11 is used, it is possible to effectively utilize the area of the display screen and to change the display orientation of the bird's eye view X without requiring the user's time and effort. Furthermore, an effect can be achieved that it is possible to display the bird's eye view video X with the traveling direction of the vehicle corresponding to the display orientation of the bird's eye view video X, with the display orientation of the bird's eye view video X being consistent with the traveling direction of the vehicle, and with no unnatural impression.

(4) Fourth Embodiment

Figure 11:
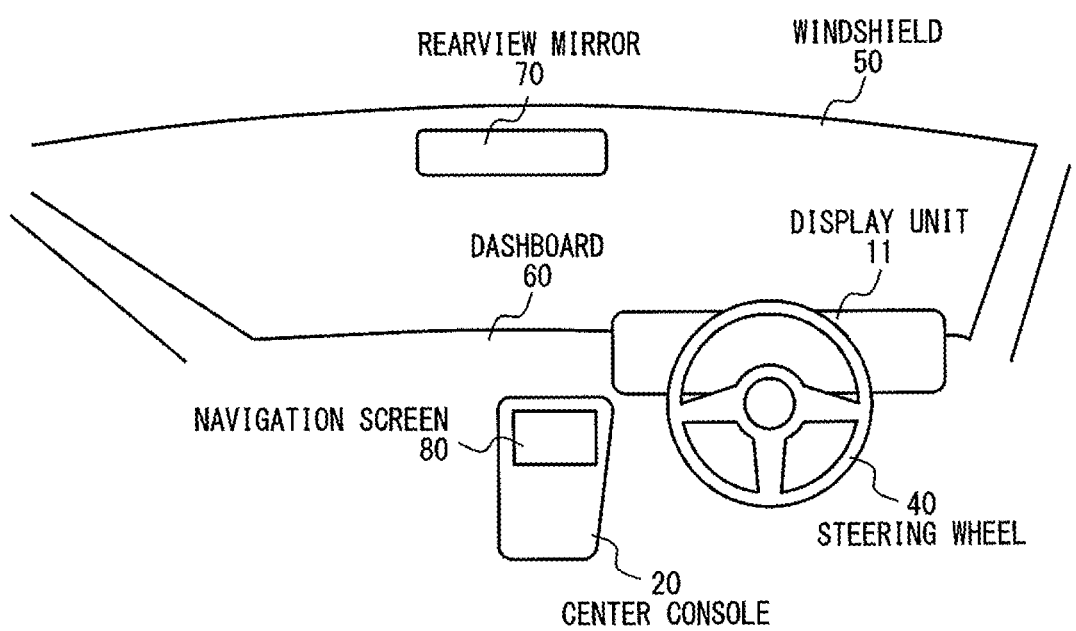
FIG. 11 is a schematic diagram showing an example of a front side of a driver's seat in a vehicle on which the display device for the vehicle according to the fourth, fifth, seventh embodiments is mounted.

FIG. 11 is a diagram schematically showing an example of a front side of a driver's seat in a vehicle on which a display device for a vehicle according 10 to a fourth embodiment is mounted. The vehicle shown in FIG. 11 differs from the configuration according to the first embodiment shown in FIG. 1 in following points. In the vehicle shown in FIG. 11, a cluster panel disposed in front of the driver's seat on the dashboard 60 below the windshield 50 is the horizontally long display unit 11 that displays a bird's eye view video. Further, in the vehicle shown in FIG. 11, a navigation screen 80 is disposed in place of the display unit 11 on the center console 20. The display unit 11 is a cluster panel and displays a speedometer, an engine tachometer, and the like in addition to the above-mentioned bird's eye view video.

The display device for the vehicle 10 according to the fourth embodiment is similar to the display device for the vehicle 10 of the first embodiment in configuration, but operates differently. In the fourth embodiment, the display control unit 123 displays the bird's eye view video X in the left or right direction on the display unit 11 according to the steering orientation of the vehicle. Specifically, the display control unit 123 performs control to display the bird's eye view video X on the display unit 11 in the same direction as the steering orientation of the vehicle. In the fourth embodiment, when the steering orientation of the vehicle is left, the display control unit 123 performs control so that the bird's eye view video X is displayed at the left end part of the display unit 11, whereas when the steering orientation of the vehicle is right, the display control unit 123 performs control so that the bird's eye view video X is displayed at the right end part of the display unit 11.

Figure 12:
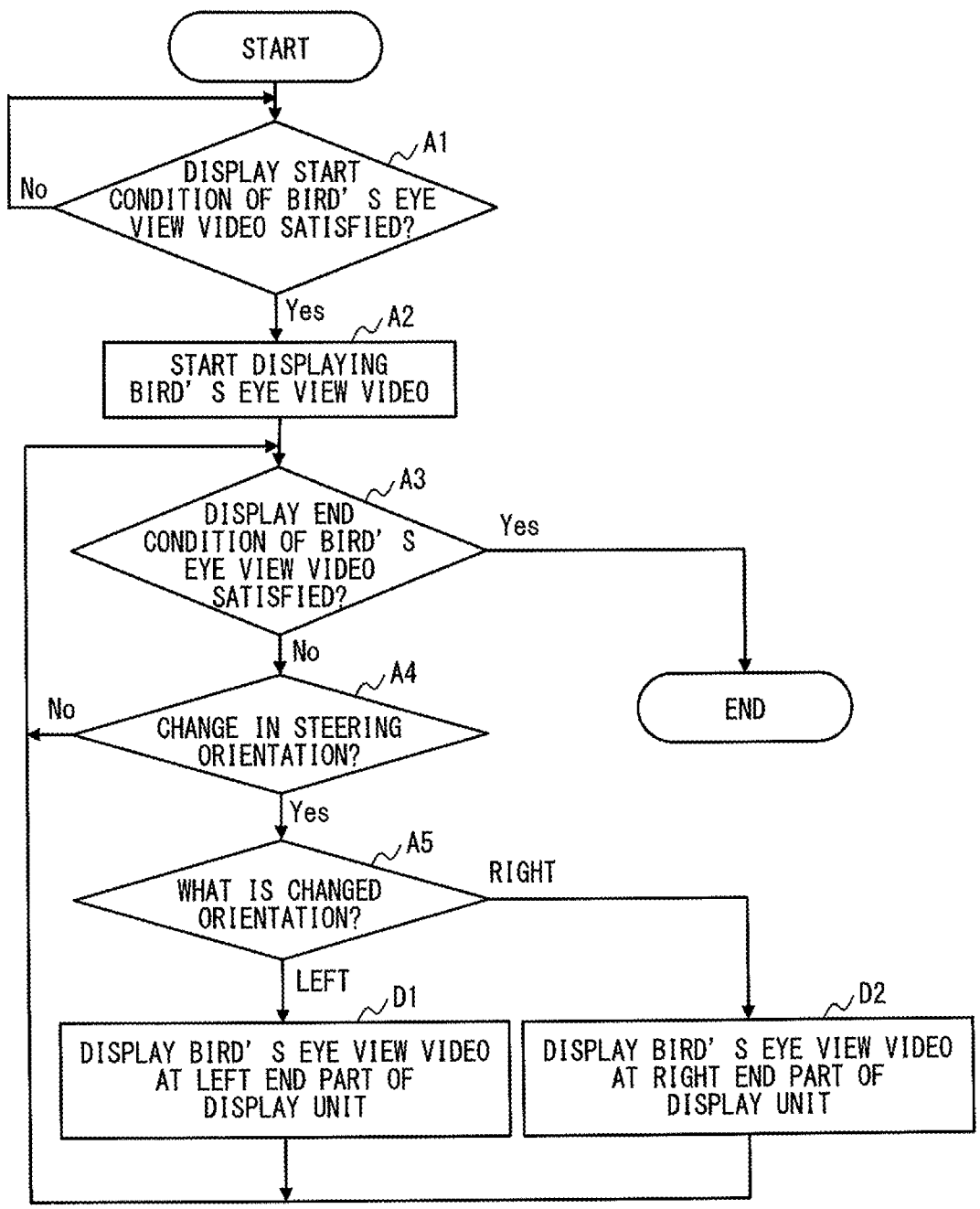
FIG. 12 is a flowchart showing an operation example of displaying the bird's eye view video on the display device for the vehicle according to the fourth embodiment.

Therefore, the description of the configuration of the display device for the vehicle 10 according to the fourth embodiment will be omitted, and only an operation of the display device for the vehicle 10 according to the fourth embodiment will be described. FIG. 12 is a flowchart showing an operation example of displaying the bird's eye view video X on the display device for the vehicle 10 according to the fourth embodiment. The flowchart shown in FIG. 12 differs from the flowchart of the first embodiment shown in FIG. 4 in that Steps A6 and A7 are replaced with Steps D1 and D2, respectively.

Figure 13:
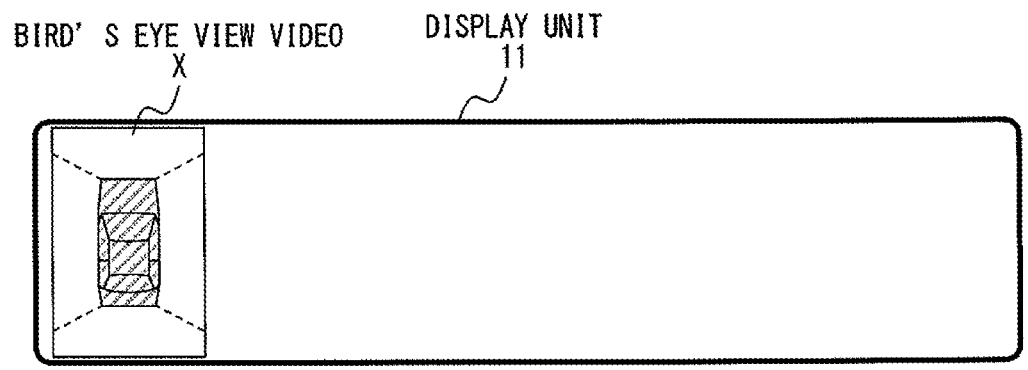
FIG. 13 is a diagram showing a display example of the bird's eye view video displayed on the display device for the vehicle according to the fourth, fifth, and seventh embodiments.

First, like in the first embodiment, the processes of Steps A1 to A5 are performed. In Step A5, if the changed steering orientation of the vehicle is left, the display control unit 123 performs control in such a way that the bird's eye view video X generated by the bird's eye view video generation unit 122 is displayed at the left end part of the display unit 11 (Step D1). FIG. 13 shows a display example of the bird's eye view video X displayed on the display unit 11 at this time. Note that in a vehicle in which the steering wheel 40 is mounted on the right side, when the process of Step D1 is performed for the first time after the process has proceeded from Step A2, the display control unit 123 does not change the display position of the bird's eye view video X and leave it as it is at the left end part of the display unit 11. When the process of Step D1 is ended, the process returns to Step A3.

Figure 14:
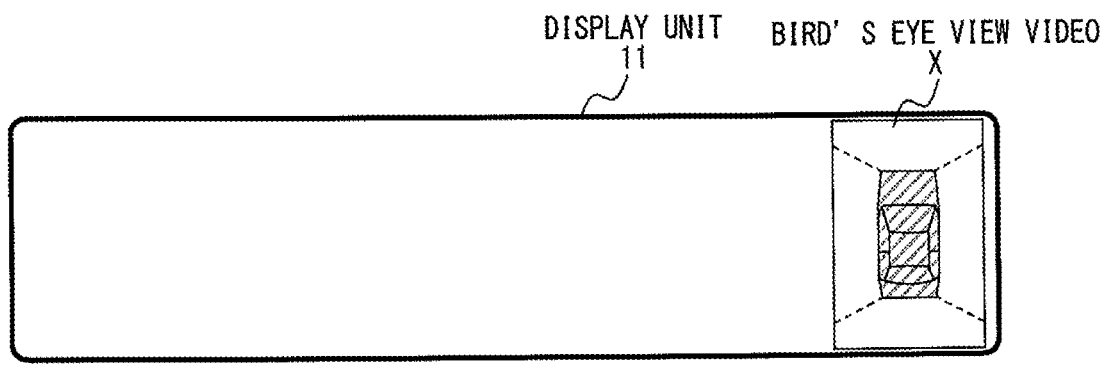
FIG. 14 is a diagram showing a display example of the bird's eye view video displayed on the display device for the vehicle according to the fourth, fifth, and seventh embodiments.

In Step A5, if the changed steering orientation of the vehicle is right, the display control unit 123 performs control in such a way that the bird's eye view video X generated by the bird's eye view video generation unit 122 is displayed at the right end part of the display unit 11 (Step D2). FIG. 14 shows a display example of the bird's eye view video X displayed on the display unit 11 at this time. Note that in a vehicle in which the steering wheel 40 is mounted on the left side, when the processing of Step D2 is performed for the first time after the process has proceeded from Step A2, the display control unit 123 does not change the display position of the bird's eye view video X and leave it as it is at the right end part of the display unit 11. When the process of Step D2 is ended, the process returns to Step A3.

As described above, according to the fourth embodiment, the display device for the vehicle 10 determines the steering orientation of the vehicle based on the information on the steering angle of the vehicle and displays the bird's eye view video X in the left or right direction on the display unit 11 according to the steering orientation of the vehicle.

Here, in a case where the bird's eye view video X is displayed on the display unit 11, it is considered that the direction of the visual observation when the driver is visually observing outside the vehicle is often the same as the steering orientation of the vehicle. In the fourth embodiment, the bird's eye view video X is displayed in the left or right direction on the display unit 11 according to the steering orientation of the vehicle. Specifically, the bird's eye view video X is displayed on the display unit 11 in the same direction as the steering orientation of the vehicle. Therefore, the bird's eye view video X is displayed on the display unit 11 in the same direction as the direction of the visual observation in which the driver is visually observing outside the vehicle. In this way, it is easy for a driver to visually observe both the bird's eye view video and outside the vehicle (5) Fifth Embodiment A vehicle on which a display device for a vehicle 10 according to a fifth embodiment is mounted is the same as that of the fourth embodiment. The display device for the vehicle 10 according to the fifth embodiment is similar to the display device for the vehicle 10 of the fourth embodiment in configuration, but operates differently. In the fifth embodiment, when the steering orientation of the vehicle is maintained for a predetermined time or longer, the display control unit 123 performs control in such a way that the bird's eye view video X is displayed on the display unit 11 in the same direction as the steering orientation of the vehicle.

Figure 15:
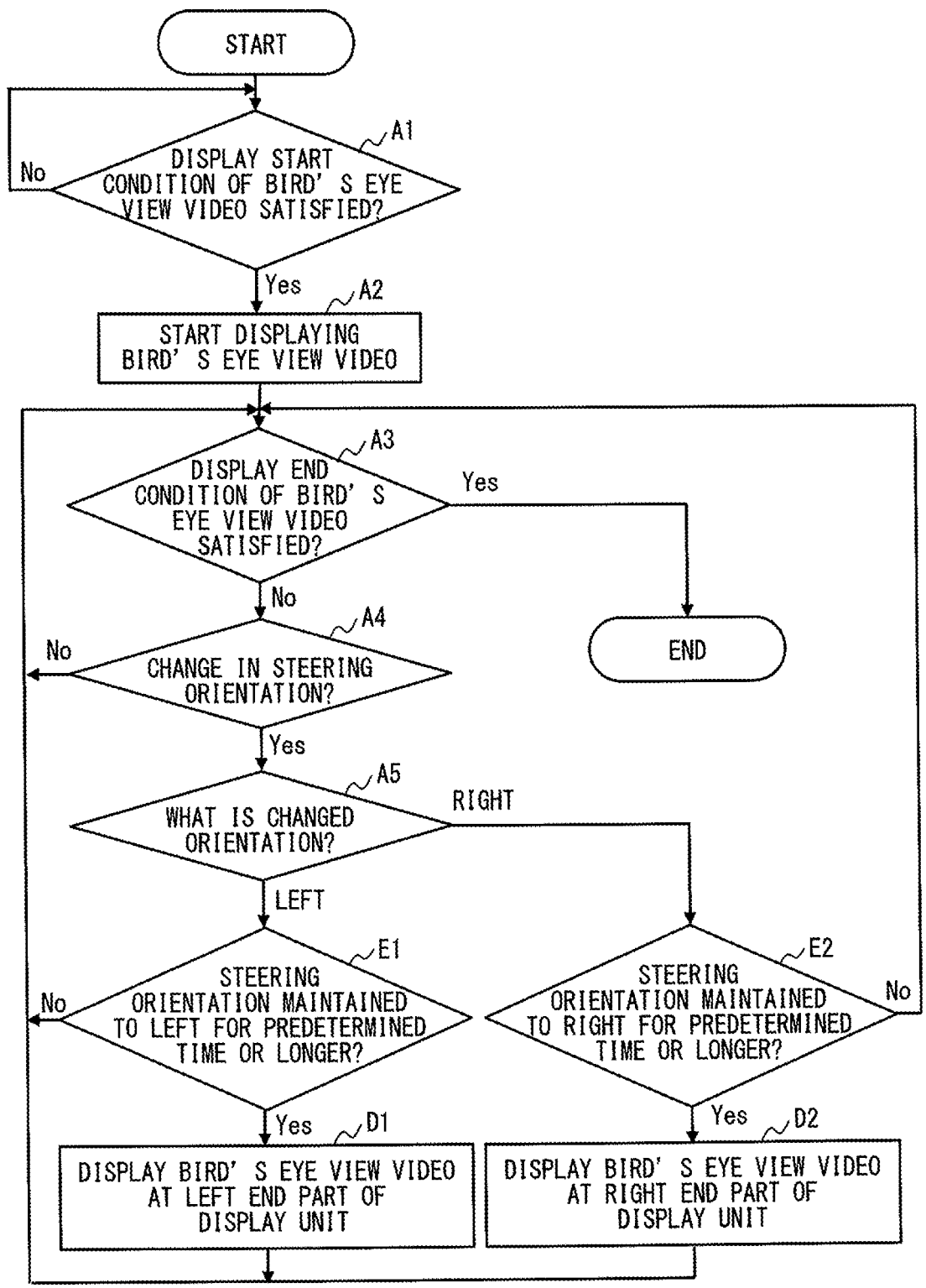
FIG. 15 is a flowchart showing an operation example of displaying the bird's eye view video on the display device for the vehicle according to the fifth embodiment.

Therefore, the description of the configuration of the display device for the vehicle 10 according to the fifth embodiment will be omitted, and only an operation of the display device for the vehicle 10 according to the fifth embodiment will be described. FIG. 15 is a flowchart showing an operation example of displaying the bird's eye view video X on the display device for the vehicle 10 according to the fifth embodiment. The flowchart shown in FIG. 15 differs from the flowchart of the fourth embodiment shown in FIG. 12 in that Steps E1 and E2 are added to the flowchart shown in FIG. 12.

First, like in the fourth embodiment, the processes of Steps A1 to A5 are performed.

In Step A5, if the changed steering orientation of the vehicle is left, the orientation determination unit 124 measures a time during which the steering orientation of the vehicle is maintained to the left, and the display control unit 123 determines as to whether or not the steering orientation of the vehicle is maintained to the left for the predetermined time or longer (Step E1). At this time, when the steering orientation of the vehicle is left, regardless of changes in the steering angle of the vehicle, the orientation determination unit 124 determines that the steering angle of the vehicle is maintained to the left. The predetermined time may be, for example, about five seconds.

In Step E1, when the steering orientation of the vehicle is maintained to the left for the predetermined time or longer (Yes in Step E1), the display control unit 123 performs control in such a way that the bird's eye view video X generated by the bird's eye view video generation unit 122 is displayed at the left end part of the display unit 11 (Step D1). On the other hand, in Step E1, when the steering orientation of the vehicle is not maintained to the left for the predetermined time or longer (No in Step E1), the process returns to Step A3. As an example of a case where Step E1 is No, there may be a case where the steering orientation of the vehicle has been changed from left to right before the predetermined time elapses.

In Step A5, if the changed steering orientation of the vehicle is right, the orientation determination unit 124 measures a time during which the steering orientation of the vehicle is maintained to the right, and the display control unit 123 determines as to whether or not the steering orientation of the vehicle is maintained to the right for the predetermined time or longer (Step E2). At this time, when the steering orientation of the vehicle is right, regardless of changes in the steering angle of the vehicle, the orientation determination unit 124 determines that the steering angle of the vehicle is maintained to the right. As in the Step E1, the predetermined time may be, for example, about five seconds.

In Step E2, when the steering orientation of the vehicle is maintained to the right for the predetermined time or longer (Yes in Step E2), the display control unit 123 performs control in such a way that the bird's eye view video X generated by the bird's eye view video generation unit 122 is displayed at the right end part of the display unit 11 (Step D2). On the other hand, in Step E2, when the steering orientation of the vehicle is not maintained to the right for the predetermined time or longer (No in Step E2), the process returns to Step A3. As an example of a case where Step E2 is No, there may be a case where the steering orientation of the vehicle has been changed from right to left before the predetermined time elapses.

As described above, according to the fifth embodiment, in the display device for the vehicle 10, when the steering orientation of the vehicle is changed and the changed direction is maintained for the predetermined time or longer, the bird's eye view video X is displayed on the display unit 11 in the same direction as the changed steering orientation of the vehicle.

Therefore, even when the steering orientation of the vehicle is changed, if the steering orientation of the vehicle returns to its original state before the predetermined time elapses, the display position of the bird's eye view video X on the display unit 11 remains to be oriented to the original steering orientation of the vehicle. In this way, it is possible to prevent the display position of the bird's eye view video X on the display unit 11 from being frequently switched between the left and right directions.

The fifth embodiment is the same as the fourth embodiment in that the bird's eye view video X is displayed in the left or right direction on the display unit 11 according to the steering orientation of the vehicle. Accordingly, like the fourth embodiment, in the fifth embodiment, it is possible to achieve an effect that facilitates the driver to visually observe both the bird's eye view video and outside the vehicle.

(6) Sixth Embodiment

Figure 16:
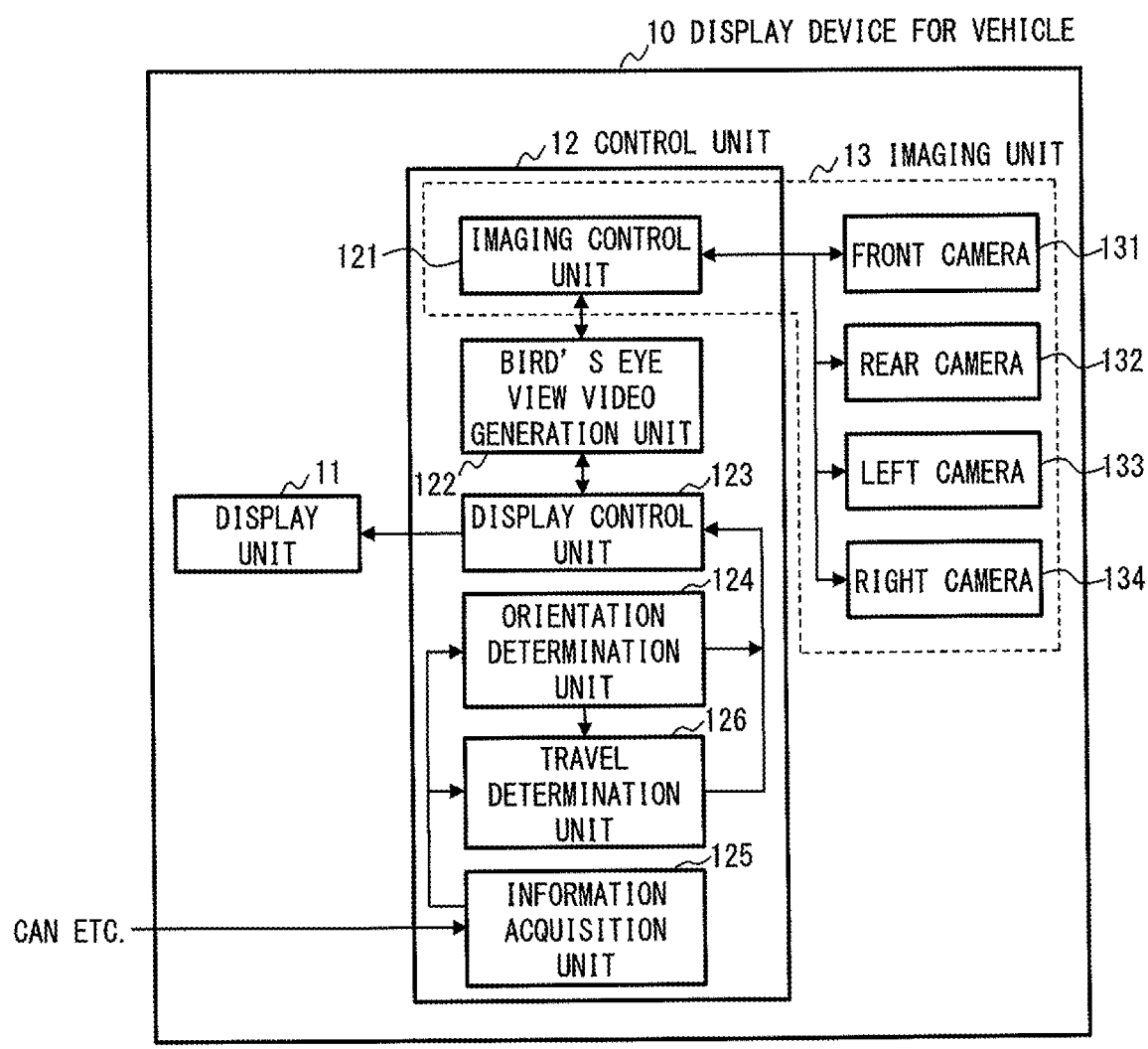
FIG. 16 is a block diagram showing a configuration example of a display device for a vehicle according to the sixth and seventh embodiments.

A vehicle on which a display device for a vehicle 10 according to a sixth embodiment is mounted is the same as that of the first embodiment. FIG. 16 is a block diagram showing a configuration example of the display device for the vehicle 10 according to the sixth embodiment. A configuration of the display device for the vehicle 10 shown in FIG. 16 differs from the configuration of the first embodiment shown in FIG. 2 in that a travel determination unit 126 is added to the configuration of the display device for the vehicle 10 shown in FIG. 16. In the sixth embodiment, the information acquisition unit 125 acquires information on a traveling speed of the vehicle from the CAN or the vehicle speed sensor in addition to obtaining the information on the steering angle of the vehicle from the CAN or the steering angle sensor. When the steering orientation of the vehicle is changed, the travel determination unit 126 uses the information on the traveling speed of the vehicle acquired by the information acquisition unit 125 to measure a traveling distance traveled by the vehicle while the changed steering orientation of the vehicle is maintained.

In the sixth embodiment, when the vehicle has traveled for the predetermined distance or longer while the steering orientation of the vehicle is maintained, the display control unit 123 performs control in such a way that the bird's eye view video X is displayed laterally on the display unit 11 so that the front of the vehicle in the bird's eye view video X is oriented to the steering orientation of the vehicle.

Figure 17:
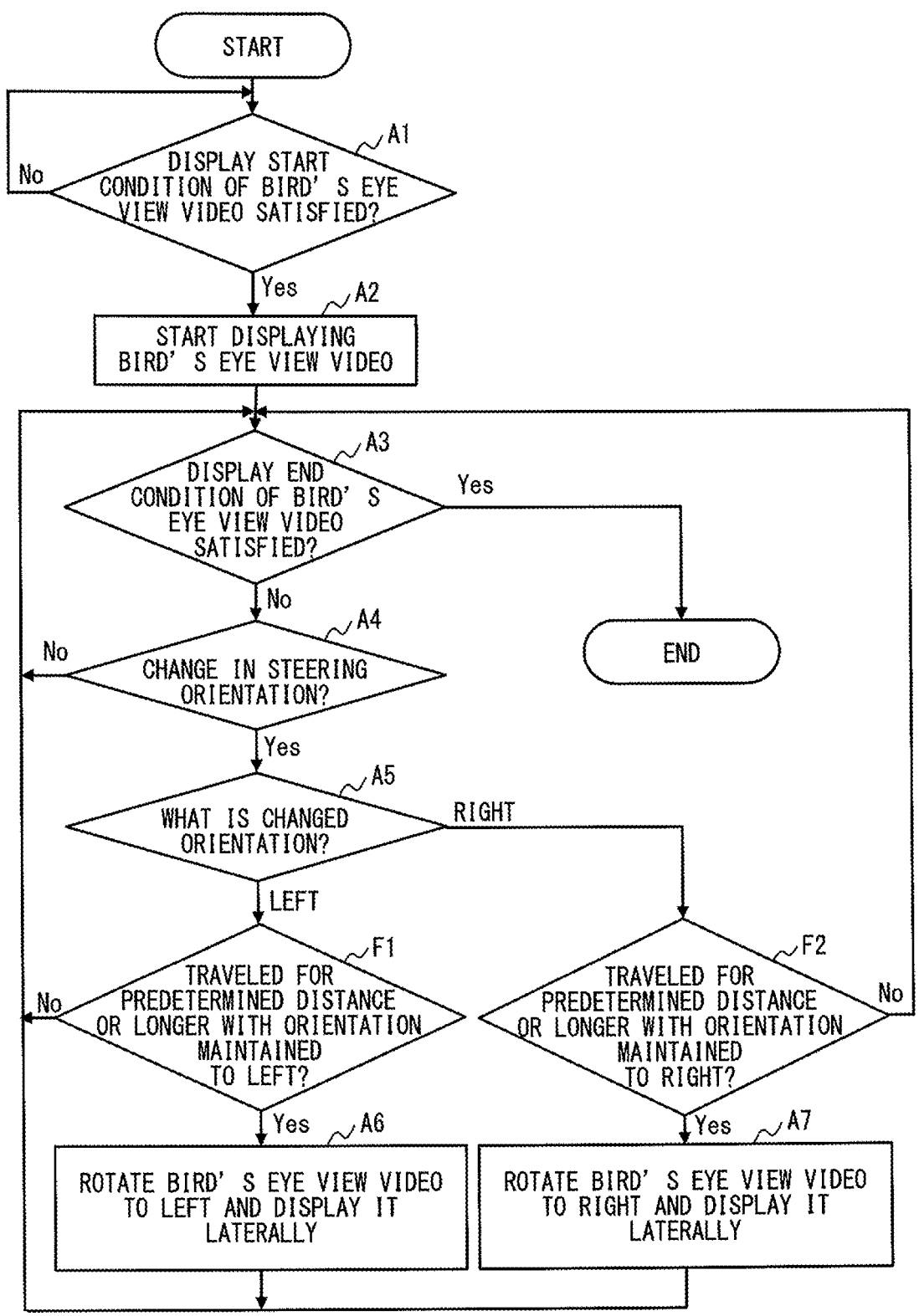
FIG. 17 is a flowchart showing an operation example of displaying the bird's eye view video on the display device for the vehicle according to the sixth embodiment.

Hereinafter, an operation of the display device for the vehicle 10 according to the sixth embodiment will be described. FIG. 17 is a flowchart showing an operation example of displaying the bird's eye view video X on the display device for the vehicle 10 according to the sixth embodiment. The flowchart shown in FIG. 17 differs from the flowchart of the first embodiment shown in FIG. 4 in that Steps F1 and F2 are added to the flowchart shown in FIG. 4.

First, like in the first embodiment, the processes of Steps A1 to A5 are performed.

In Step A5, if the changed steering orientation of the vehicle is left, the travel determination unit 126 measures the traveling distance traveled by the vehicle while the steering orientation of the vehicle is maintained to the left. Further, the display control unit 123 determines as to whether or not the vehicle has traveled for the predetermined distance or longer while the steering orientation of the vehicle is maintained to the left (Step F1). At this time, the travel determination unit 126 measures the traveling distance by integrating the time elapsed since the steering orientation of the vehicle has been changed to the left with the traveling speed of the vehicle acquired by the information acquisition unit 125.

In Step F1, when the vehicle has traveled for the predetermined distance or longer while the steering orientation of the vehicle is maintained to the left (Yes in Step F1), the display control unit 123 performs control in such a way that the bird's eye view video X generated by the bird's eye view video generation unit 122 is rotated to the left and displayed laterally on the display unit 11 (Step A6). On the other hand, in Step F1, when the vehicle has not traveled for the predetermined distance or longer while the steering orientation of the vehicle is maintained to the left (No in Step F1), the process returns to Step A3. Note that as a case where the Step F1 is No may be a case where the steering orientation of the vehicle is changed from left to right before the vehicle travels for the predetermined distance. Moreover, a timeout period may be provided, and a case where the vehicle has not traveled for the predetermined distance after the timeout period has elapsed since the steering orientation of the vehicle has been changed to the left may be determined as No in Step F1.

In Step A5, if the changed steering orientation of the vehicle is right, the travel determination unit 126 measures the traveling distance traveled by the vehicle while the steering orientation of the vehicle is maintained to the right. Further, the display control unit 123 determines as to whether or not the vehicle has traveled for predetermined distance or longer while the steering orientation of the vehicle is maintained to the right (Step F2). The method performed by the travel determination unit 126 for measuring the traveling distance in Step F2 is the same as that in Step F1.

In Step F2, when the vehicle has traveled for the predetermined distance or longer while the steering orientation of the vehicle is maintained to the right (Yes in Step F2), the display control unit 123 performs control in such a way that the bird's eye view video X generated by the bird's eye view video generation unit 122 is rotated to the right and displayed laterally on the display unit 11 (Step A7). On the other hand, when the vehicle has not traveled for the predetermined distance or greater while the steering orientation of the vehicle is maintained to the right in Step F2 (No in Step F2), the process returns to Step A3. Note that as a case where the Step F2 is No may be a case where the steering orientation of the vehicle is changed from right to left before the vehicle travels for the predetermined distance. Moreover, a timeout period may be provided, and a case where the vehicle has not traveled for the predetermined distance or longer after the timeout period has elapsed since the steering orientation of the vehicle has been changed to the right may be determined as No in Step F2.

As described above, according to the sixth embodiment, in the display device for the vehicle 10, when the steering orientation of the vehicle is changed, and the vehicle has traveled for the predetermined distance or longer in the changed direction, the display device for the vehicle 10 displays the bird's eye view video X laterally on the display unit 11 so that the front of the vehicle in the bird's eye view video X is oriented to the changed steering orientation of the vehicle.

Therefore, even when the steering orientation of the vehicle has been changed, if the steering orientation of the vehicle is returned to the original state before the vehicle travels for the predetermined distance, the front of the vehicle in the bird's eye view video X displayed on the display unit 11 remains to be oriented to the original steering orientation of the vehicle. In this way, it is possible to prevent the left and right orientations of the vehicle in the bird's eye view video X displayed on the display unit 11 from being frequently switched.

Further, the sixth embodiment is the same as the first embodiment in that the display orientation of the bird's eye view video X is changed according to the steering orientation of the vehicle, and the bird's eye view video X is displayed. Therefore, like the first embodiment, in the sixth embodiment, even when the horizontally long display unit 11 is used, it is possible to effectively utilize the area of the display screen and to change the display orientation of the bird's eye view X without requiring the user's time and effort. Furthermore, an effect can be achieved that it is possible to display the bird's eye view video X with the traveling direction of the vehicle corresponding to the display orientation of the bird's eye view video X and the display orientation of the bird's eye view video X being consistent with the traveling direction of the vehicle and with no unnatural impression.

(7) Seventh Embodiment

A vehicle on which a display device for a vehicle 10 according to a seventh embodiment is mounted is the same as that of the fourth embodiment. The display device for the vehicle 10 according to the seventh embodiment is similar to the display device for the vehicle 10 of the sixth embodiment in configuration, but operates differently. In the seventh embodiment, the display control unit 123 performs control in such a way that, when the vehicle has traveled for the predetermined distance or longer while the steering orientation of the vehicle is maintained, the bird's eye view video X is displayed on the display unit 11 in the same direction as the steering orientation of the vehicle.

Figure 18:
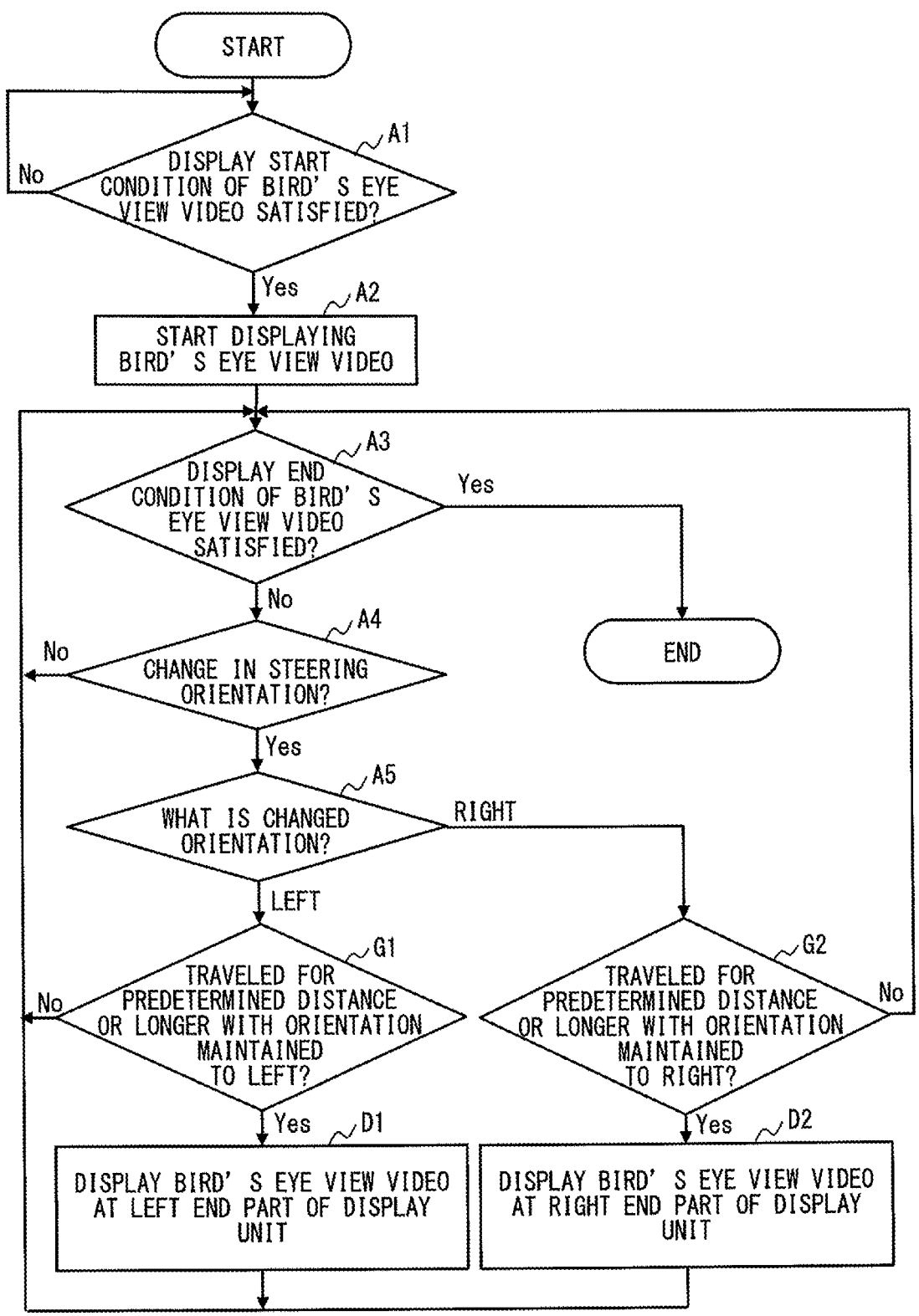
FIG. 18 is a flowchart showing an operation example of displaying the bird's eye view video on the display device for the vehicle according to the seventh embodiment.

Therefore, the description of the configuration of the display device for the vehicle 10 according to the seventh embodiment will be omitted, and only an operation of the display device for the vehicle 10 according to the seventh embodiment will be described. FIG. 18 is a flowchart showing an operation example of displaying the bird's eye view video X on the display device for the vehicle 10 according to the seventh embodiment. The flowchart shown in FIG. 18 differs from the flowchart of the fourth embodiment shown in FIG. 12 in that Steps G1 and G2 are added to the flowchart shown in FIG. 12.

First, like in the fourth embodiment, the processes of Steps A1 to A5 are performed.

In Step A5, if the changed steering orientation of the vehicle is left, the travel determination unit 126 measures the traveling distance traveled by the vehicle while the steering orientation of the vehicle is maintained to the left. Further, the display control unit 123 determines as to whether or not the vehicle has traveled for predetermined distance or longer while the steering orientation of the vehicle is maintained to the left (Step G1). At this time, the travel determination unit 126 measures the traveling distance by integrating the time elapsed since the steering orientation of the vehicle has been changed to the left with the traveling speed of the vehicle acquired by the information acquisition unit 125.

In Step G1, when the vehicle has traveled for the predetermined distance or longer while the steering orientation of the vehicle is maintained to the left (Yes in Step G1), the display control unit 123 performs control in such a way that the bird's eye view video X generated by the bird's eye view video generation unit 122 is displayed at the left end part of the display unit 11 (Step D1). On the other hand, in Step G1, when the vehicle has not traveled for the predetermined distance or longer while the steering orientation of the vehicle is maintained to the left (No in Step G1), the process returns to Step A3. Note that as a case where the Step G1 is No may be a case where the steering orientation of the vehicle is changed from left to right before the vehicle travels for the predetermined distance. Moreover, a timeout period may be provided, and a case where the vehicle has not traveled for the predetermined distance after the timeout period has elapsed since the steering orientation of the vehicle has been changed to the left may be determined as No in Step G1.

Further, in Step A5, if the changed steering orientation of the vehicle is right, the travel determination unit 126 measures the traveling distance traveled by the vehicle while the steering orientation of the vehicle is maintained to the right. Further, the display control unit 123 determines as to whether or not the vehicle has traveled for predetermined distance or longer while the steering orientation of the vehicle is maintained to the right (Step G2). The method performed by the travel determination unit 126 for measuring the traveling distance in Step G2 is the same as that in Step G1.

In Step G2, when the vehicle has traveled for the predetermined distance or longer while the steering orientation of the vehicle is maintained to the right (Yes in Step G2), the display control unit 123 performs control in such a way that the bird's eye view video X generated by the bird's eye view video generation unit 122 is displayed at the right end part of the display unit 11 (Step D2). On the other hand, in Step G2, when the vehicle has not traveled for the predetermined distance or longer while the steering orientation of the vehicle is maintained to the right (No in Step G2), the process returns to Step A3. Note that as a case where the Step G2 is No may be a case where the steering orientation of the vehicle is changed from right to left before the vehicle travels for the predetermined distance. Moreover, a timeout period may be provided, and a case where the vehicle has not traveled for the predetermined distance or longer after the timeout period has elapsed since the steering orientation of the vehicle has been changed to the right may be determined as No in Step G2.

As described above, according to the seventh embodiment, in the display device for the vehicle 10, when the steering orientation of the vehicle is changed, and the vehicle has traveled for the predetermined distance or longer in the changed orientation, the display device for the vehicle 10 displays the bird's eye view video X on the display unit 11 in the same direction as the changed steering orientation of the vehicle.

Therefore, even when the steering orientation of the vehicle has been changed, if the steering orientation of the vehicle is returned to the original state before the vehicle travels for the predetermined distance, the display position of the bird's eye view video X on the display unit 11 remains to be oriented to the original steering orientation of the vehicle. In this way, it is possible to prevent the display position of the bird's eye view video X on the display unit 11 from being frequently switched between the left and right directions.

The seventh embodiment is the same as the fourth embodiment in that the bird's eye view video X is displayed in the left or right direction on the display unit 11 according to the steering orientation of the vehicle. Accordingly, as in the fourth embodiment, according to the seventh embodiment, it is possible to achieve an effect that facilitates the driver to visually observe both the bird's eye view video and outside the vehicle.

Note that the present disclosure is not limited to the above-described embodiments, and can be appropriately changed without departing from the spirit thereof. For example, although the above-described second, third, and sixth embodiments have been described as separate embodiments, these second, third, and sixth embodiments may be used in combination.

Further, although the above-described fifth and seventh embodiments have been described as separate embodiments, these fifth and seventh embodiments may be used in combination.

Figure 19:
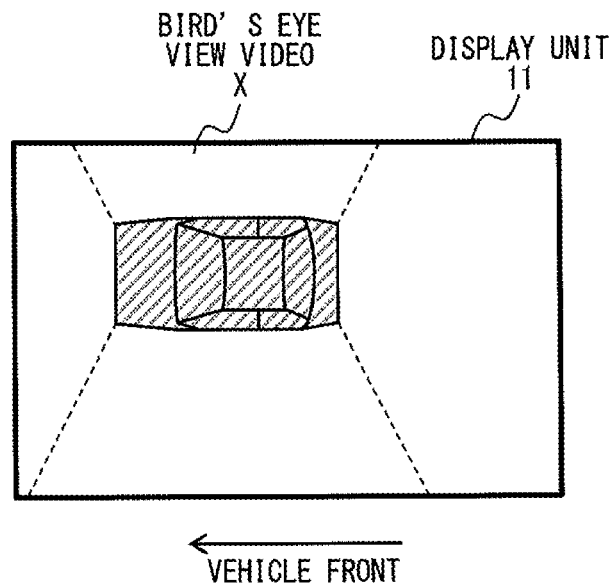
FIG. 19 is a diagram showing a display example of the bird's eye view video displayed on a display device for a vehicle according to other embodiments.
Figure 20:
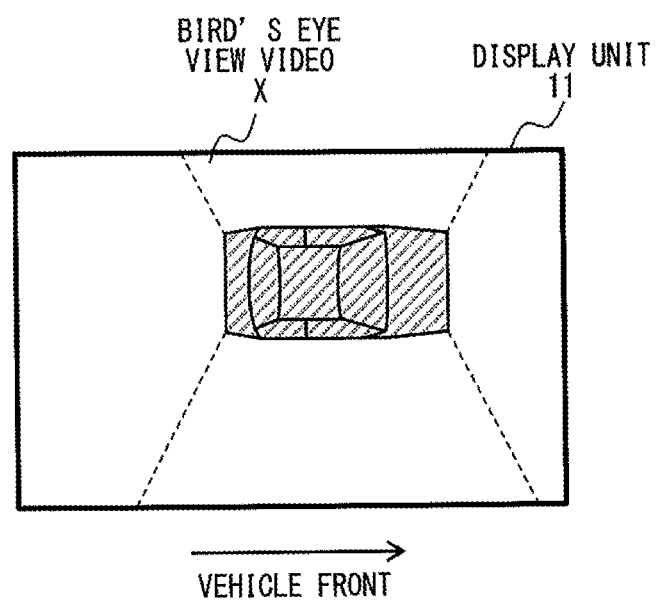
FIG. 20 is a diagram showing a display example of the bird's eye view video displayed on the display device for the vehicle according to other embodiments.
Figure 21:
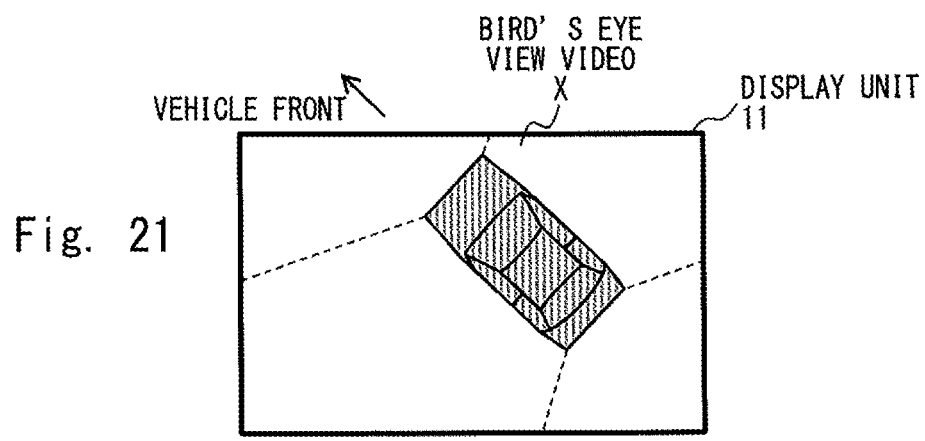
FIG. 21 is a diagram showing a display example of the bird's eye view video displayed on the display device for the vehicle according to other embodiments.
Figure 22:
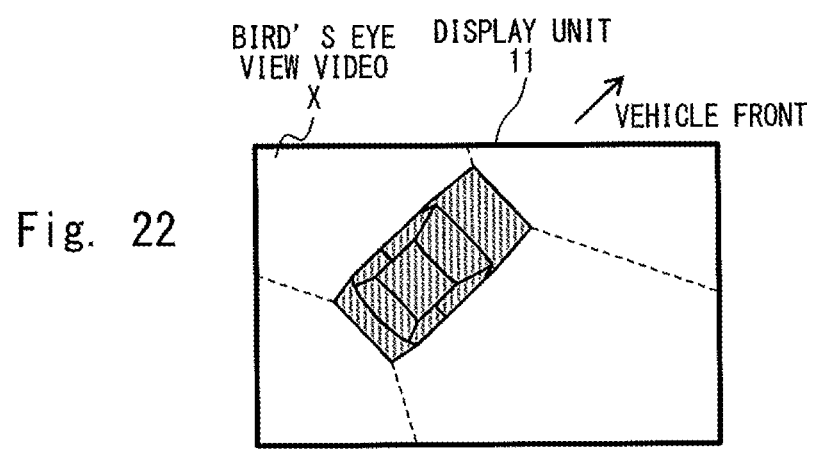
FIG. 22 is a diagram showing a display example of the bird's eye view video displayed on the display device for the vehicle according to other embodiments.

In the first, second, third, and sixth embodiments described above, the bird's eye view video generation unit 122 generates the bird's eye view video X so that the vehicle in the bird's eye view video X is located substantially at the center the bird's eye view video X. However, it is not limited to this. For example, when the driver visually observes the front of the vehicle, a virtual viewpoint position of the driver on the bird's eye view video X is considered to be moved to the upper part of the display unit 11. Therefore, when the display control unit 123 performs control in such a way that the display orientation of the bird's eye view video X is changed and the bird's eye view video X is displayed on the display unit 11, the bird's eye view video generation unit 122 may generate the bird's eye view video X so that the vehicle in the bird's eye view video X is displayed close to the upper part of the display unit 11. FIGS. 19 to 22 show display examples when such a bird's eye view video X is displayed on the display unit 11. FIG. 19 is a display example when the steering orientation of the vehicle is left in the first, third, and sixth embodiments. FIG. 20 is a display example when the steering orientation of the vehicle is right in the first, third, and sixth embodiments. FIG. 21 is a display example when the steering orientation of the vehicle is left in the second embodiment. FIG. 22 is a display example when the steering orientation of the vehicle is right in the second embodiment. By generating such a bird's eye view video X, even when the virtual viewpoint position of the driver on the bird's eye view video X is moved to the upper part of the display unit 11, the bird's eye view video X can be displayed so that the driver can easily see.

Figure 23:
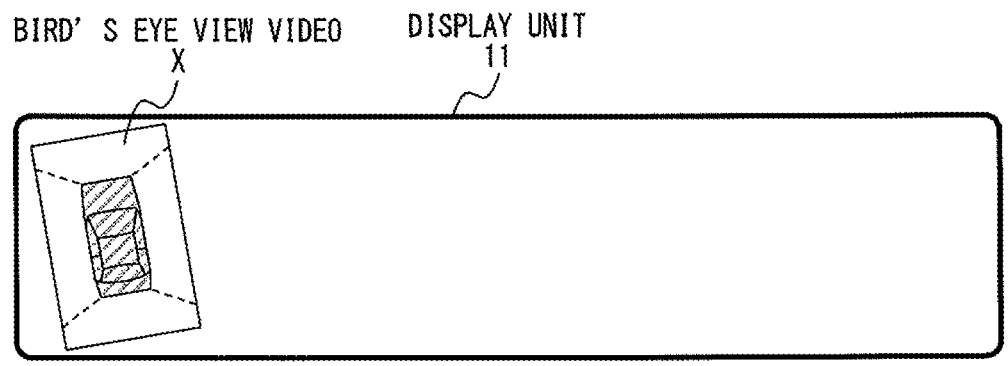
FIG. 23 is a diagram showing a display example of the bird's eye view video displayed on the display device for the vehicle according to other embodiments.
Figure 24:
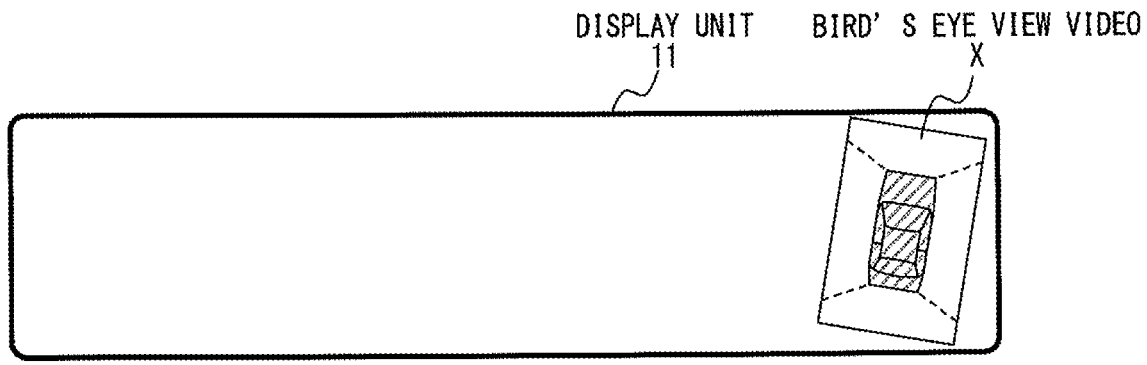
FIG. 24 is a diagram showing a display example of the bird's eye view video displayed on the display device for the vehicle according to other embodiments.

Further, according to the fourth, fifth, and seventh embodiments, the display control unit 123 performs control in such a way that the portrait bird's eye view video X generated by the bird's eye view video generation unit 122 is displayed without being tilted. However, it is not limited to this. For example, the display control unit 123 may perform control in such a way that the bird's eye view video X is displayed in a tilted manner so that a lower part of the bird's eye view video X is close to a center of the display unit 11 in the left and right direction than an upper part thereof. FIGS. 23 and 24 show display examples when the bird's eye view video X is tilted and displayed on the display unit 11 in this way. FIG. 23 is a display example when the steering orientation of the vehicle is left. FIG. 24 is a display example when the steering orientation of the vehicle is right.

Figure 25:
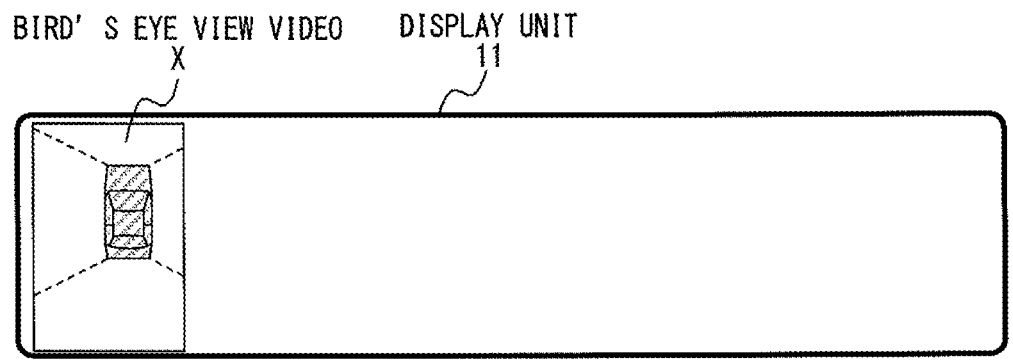
FIG. 25 is a diagram showing a display example of the bird's eye view video displayed on the display device for the vehicle according to other embodiments.
Figure 26:
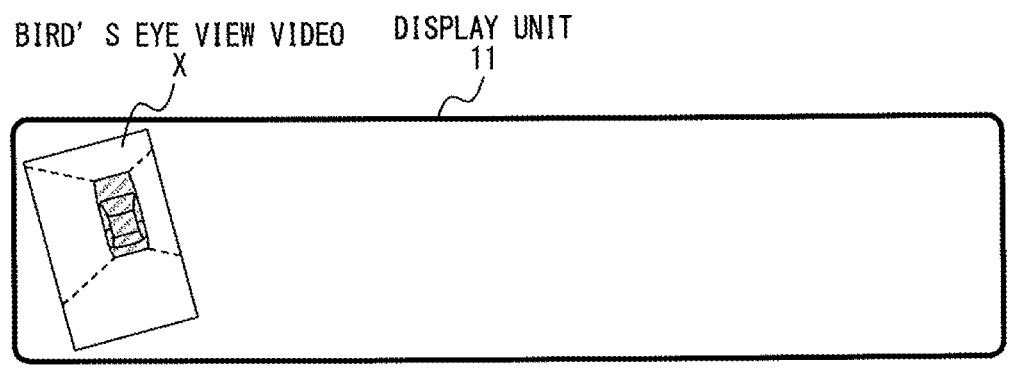
FIG. 26 is a diagram showing a display example of the bird's eye view video displayed on the display device for the vehicle according to other embodiments.

According to the fourth, fifth, and seventh embodiments, the bird's eye view video generation unit 122 generates the bird's eye view video X so that the vehicle in the bird's eye view video X is located substantially at the center of the bird's eye view video X. However, it is not limited to this. For example, when the driver visually observes the front of the vehicle, the virtual viewpoint position of the driver on the bird's eye view video X is considered to move to the upper part and to the center of the display unit 11 in the left and right direction. Therefore, when the display control unit 123 performs control in such a way that the bird's eye view video X is displayed in the left and right direction on the display unit 11, the bird's eye view video generation unit 122 may generate the bird's eye view video X so that the vehicle in the bird's eye view video X is displayed close to the upper part and close to the center in the left and right direction of the display unit 11. FIG. 25 shows a display example when such a bird's eye view video X is displayed on the display unit 11. FIG. 25 is a display example showing when the steering orientation of the vehicle is left. By generating such a bird's eye view video X, even when the virtual viewpoint position of the driver on the bird's eye view video X moves to the upper part and to the center in the left and right direction of the display unit 11, the bird's eye view video X can be displayed so that the driver can easily see. Further, the display control unit 123 may perform control in such a way that the bird's eye view video X shown in FIG. 25 is displayed in a tilted manner so that the lower part of the bird's eye view video X is close to the center in the left and right direction of the display unit 11 than the upper part thereof. FIG. 26 shows a display example when the bird's eye view video X shown in FIG. 25 is tilted and displayed on the display unit 11.

Furthermore, according to fourth, fifth, and seventh embodiments, the display control unit 123 performs control in such a way that the bird's eye view video X is displayed on the left or right end part of the display unit 11. However, it is not limited to this. When the steering orientation of the vehicle is left, the display control unit 123 may display the bird's eye view video X on the left side with respect to the center of the display unit 11, while when the steering orientation of the vehicle is right, the display control unit 123 may display the bird's eye view video X on the right side with respect to the center of the display unit 11.

According to the first, second, third, and sixth embodiments, the display unit 11 is disposed on the center console 20, and according to the above fourth, fifth, and seventh embodiments, the display unit 11 is in the cluster panel. However, the present disclosure is not limited to this. The display unit 11 may be a rearview mirror, a head-up display, or the like as an alternative to the rearview mirror 70 as long as it is disposed in front of the driver's seat.

According to the embodiment, the following effects can be achieved. It is possible to effectively use a display screen and to display a bird's eye view video in which a traveling direction of a vehicle is consistent with a direction of a vehicle in the bird's eye view video even when a horizontally long display unit is used or to facilitate a driver to visually observe both the bird's eye view video and outside the vehicle.

The exemplary embodiment can be applied to a display device for a vehicle for displaying a bird's eye view video and a vehicle on which the display device for the vehicle is mounted and is susceptible of industrial application.

What is claimed is:

1. A display device for a vehicle comprising:
an imaging unit configured to capture a video around a vehicle;
a bird's eye view video generation unit configured to generate a bird's eye view video obtained by converting a viewpoint of the video captured by the imaging unit so it seems as if the vehicle is seen from above;
a horizontally long display unit disposed in front of a driver's seat in the vehicle;
an information acquisition unit configured to acquire information on a steering angle of the vehicle;
an orientation determination unit configured to determine as to whether a steering orientation of the vehicle is left or right based on the information on the steering angle of the vehicle acquired by the information acquisition unit; and
a display control unit configured to perform control in such a way that a display mode of the bird's eye view video on the display unit is changed according to the steering orientation of the vehicle determined by the orientation determination unit and the bird's eye view video is displayed,
wherein
the display control unit performs control in such a way that the bird's eye view video is displayed in a tilted manner on the display unit so that a front of the vehicle in the bird's eye view video is oriented to the steering orientation of the vehicle according to the steering orientation of the vehicle determined by the orientation determination unit or the display control unit performs control in such a way that the bird's eye view video is displayed in a left or right direction on the display unit according to the steering orientation of the vehicle determined by the orientation determination unit.

2. The display device for the vehicle according to claim 1, wherein
the orientation determination unit further determines a steering angle of the vehicle based on the information on the steering angle of the vehicle acquired by the information acquisition unit, and
when the display control unit performs control in such a way that the bird's eye view video is tilted so that the front of the vehicle in the bird's eye view video is oriented to the steering orientation of the vehicle, the display control unit performs control in such a way that the bird's eye view video is displayed on the display unit in a tilted manner at an angle corresponding to the steering angle of the vehicle.

3. The display device for the vehicle according to claim 1, wherein
the orientation determination unit measures a time during which the steering orientation of the vehicle is maintained, and
when the steering orientation of the vehicle is maintained for a predetermined time or longer, the display control unit performs control in such a way that the bird's eye view video is displayed on the display unit in the same orientation as the steering orientation of the vehicle.

4. The display device for the vehicle according to claim 1, further comprising a travel determination unit configured to measure a traveling distance traveled by the vehicle while the steering orientation of the vehicle is maintained, wherein the display control unit performs control in such a way that, when the vehicle has traveled for a predetermined distance or longer while the steering orientation of the vehicle is maintained, the bird's eye view image is displayed on the display unit in the same orientation as the steering orientation of the vehicle.

5. The display device for the vehicle according to claim 1, wherein when the display control unit performs control in such a way that the bird's eye view video is displayed in the left or right direction on the display unit, the display control unit performs control in such a way that that a lower part of the bird's eye view video is closer to a center in the left and right direction of the display unit than an upper part of the bird's eye view video.

6. The display device for the vehicle according to claim 1, wherein when the display control unit performs control in such a way that the bird's eye view video is displayed in the left or right direction on the display unit, the bird's eye view video generation unit generates the bird's eye view video in which the vehicle in the bird's eye view video is displayed close to an upper part and close to the center in the left and right direction of the display unit.

7. A display method for a vehicle performed by a display device for a vehicle including a horizontally long display unit disposed in front of a driver's seat in a vehicle, the display method comprising:
- capturing a video around the vehicle;
- generating a bird's eye view video obtained by converting a viewpoint of the video captured so it seems as if the vehicle is seen from above;
- acquiring information on a steering angle of the vehicle;
- determining as to whether a steering orientation of the vehicle is left or right based on the information on the steering angle of the vehicle; and
- changing a display mode of the bird's eye view video on the display unit according to the steering orientation of the vehicle, wherein
- the bird's eye view video is displayed in a tilted manner on the display unit so that a front of the vehicle in the bird's eye view video is oriented to the steering orientation of the vehicle according to the steering orientation of the vehicle or the bird's eye view video is displayed in a left or right direction on the display unit according to the steering orientation of the vehicle.

* * * * *